US009569788B1

(12) United States Patent
Arini

(10) Patent No.: US 9,569,788 B1
(45) Date of Patent: Feb. 14, 2017

(54) SYSTEMS AND METHODS FOR ASSOCIATING INDIVIDUAL HOUSEHOLD MEMBERS WITH WEB SITES VISITED

(75) Inventor: Nick Arini, Botley (GB)

(73) Assignee: Google Inc., Mountain View, CA (US)

(*) Notice: Subject to any disclaimer, the term of this patent is extended or adjusted under 35 U.S.C. 154(b) by 300 days.

(21) Appl. No.: 13/174,597

(22) Filed: Jun. 30, 2011

Related U.S. Application Data

(60) Provisional application No. 61/482,139, filed on May 3, 2011.

(51) Int. Cl.
*G06Q 30/02* (2012.01)
(52) U.S. Cl.
CPC ................. *G06Q 30/0246* (2013.01)
(58) Field of Classification Search
CPC .... G06Q 30/02; G06Q 30/0204; G06Q 10/10; G06Q 30/0201; G06Q 30/0205; G06Q 30/0242; G06Q 30/0254; G06Q 30/0255; G06Q 30/0269; G06Q 30/0273; G06Q 30/0277; G06Q 40/00; G06Q 30/0271
USPC ...................................................... 705/14.45
See application file for complete search history.

(56) References Cited

U.S. PATENT DOCUMENTS

| 5,771,307 A | 6/1998 | Lu et al. |
| 7,139,723 B2 * | 11/2006 | Conkwright et al. ....... 705/7.33 |
| 7,146,627 B1 * | 12/2006 | Ismail et al. .................... 725/47 |
| 7,886,047 B1 * | 2/2011 | Potluri ........................... 709/224 |
| 8,700,543 B2 * | 4/2014 | Glickman ....................... 706/12 |
| 8,839,303 B2 * | 9/2014 | Maddison et al. .............. 725/53 |
| 2002/0129368 A1 * | 9/2002 | Schlack et al. ................. 725/46 |
| 2003/0067554 A1 | 4/2003 | Klarfeld et al. |
| 2006/0184410 A1 * | 8/2006 | Ramamurthy et al. ........... 705/8 |
| 2007/0136755 A1 | 6/2007 | Sakai |
| 2008/0092156 A1 | 4/2008 | Ferrone |
| 2008/0300965 A1 * | 12/2008 | Doe ............................... 705/10 |
| 2009/0070443 A1 * | 3/2009 | Vanderhook et al. ........ 709/222 |

(Continued)

OTHER PUBLICATIONS

Barry Schwartz (TV Rank: Google Gets Patent on Using What You're Watching to Influence Search Results. Sep. 17, 2014) retreived from serchengineland.com.*

(Continued)

*Primary Examiner* — Alan S Miller
*Assistant Examiner* — Folashade Anderson
(74) *Attorney, Agent, or Firm* — Foley & Lardner LLP; John D. Lanza

(57) ABSTRACT

A method executes at a server system with one or more processors and memory. The server receives demographic information for a plurality of household members. The demographic information includes at least age and gender. The server receives web activity information for the household. The server identifies one or more web activity sessions from the web activity information and selects one of the web activity sessions. The server identifies one or more web sites visited during the selected web activity session and accesses demographic skew data for at least a subset of the web sites visited. The demographic skew data for a web site identifies fractions of visitors to the web site from predefined demographic segments. The server associates a household member with the web activity session at least in part by correlating the demographic skew data of the web sites visited with the demographic information of the first household member.

12 Claims, 19 Drawing Sheets

(56) References Cited

U.S. PATENT DOCUMENTS

2011/0161997 A1   6/2011   Rourk
2012/0090007 A1   4/2012   Xiao et al.
2013/0138506 A1*  5/2013   Zhu et al. .................. 705/14.53

OTHER PUBLICATIONS

Quoar (Does the cable company know what I am viewing on my TV? What do they do with that information? Mar. 30, 2011) retrieved from quora.com.*
Naone (How Google Plans to Take Over TV, Nov. 21, 2008) retrieved from technologyreview.com.*
US Office Action for U.S. Appl. No. 13/174,546 dated Apr. 30, 2015.
Notice of Allowance for U.S. Appl. No. 13/174,546 dated Nov. 12, 2015.
US Office Action for U.S. Appl. No. 13/174,546 dated Aug. 19, 2015.
Office Action on U.S. Appl. No. 14/872,778 dated Apr. 14, 2016.
U.S. Appl. No. 13/174,546, filed Jun. 30, 2011.
U.S. Appl. No. 14/872,778, filed Oct. 1, 2015.
U.S. Appl. No. 15/044,930, filed Feb. 16, 2016.

* cited by examiner

Demographic Segments

|  | Male (802) | Gender (812) | Female (804) |
|---|---|---|---|
| 0 – 14 | Male 0 – 14 | | Female 0 – 14 |
| 15 – 19 | Male 15 – 19 | | Female 15 – 19 |
| 20 – 29 | Male 20 – 29 | | Female 20 – 29 |
| 30 – 39 | Male 30 – 39 | | Female 30 – 39 |
| 40 – 49 | Male 40 – 49 | | Female 40 – 49 |
| 50 – 59 | Male 50 – 59 | | Female 50 – 59 |
| 60 – 69 | Male 60 – 69 | | Female 60 – 69 (806) |
| 70 – 84 | Male 70 – 84 | | Female 70 – 84 |
| 85 + | Male 85 and older (808) | | Female 85 and older |

Age Range (810)

Figure 8

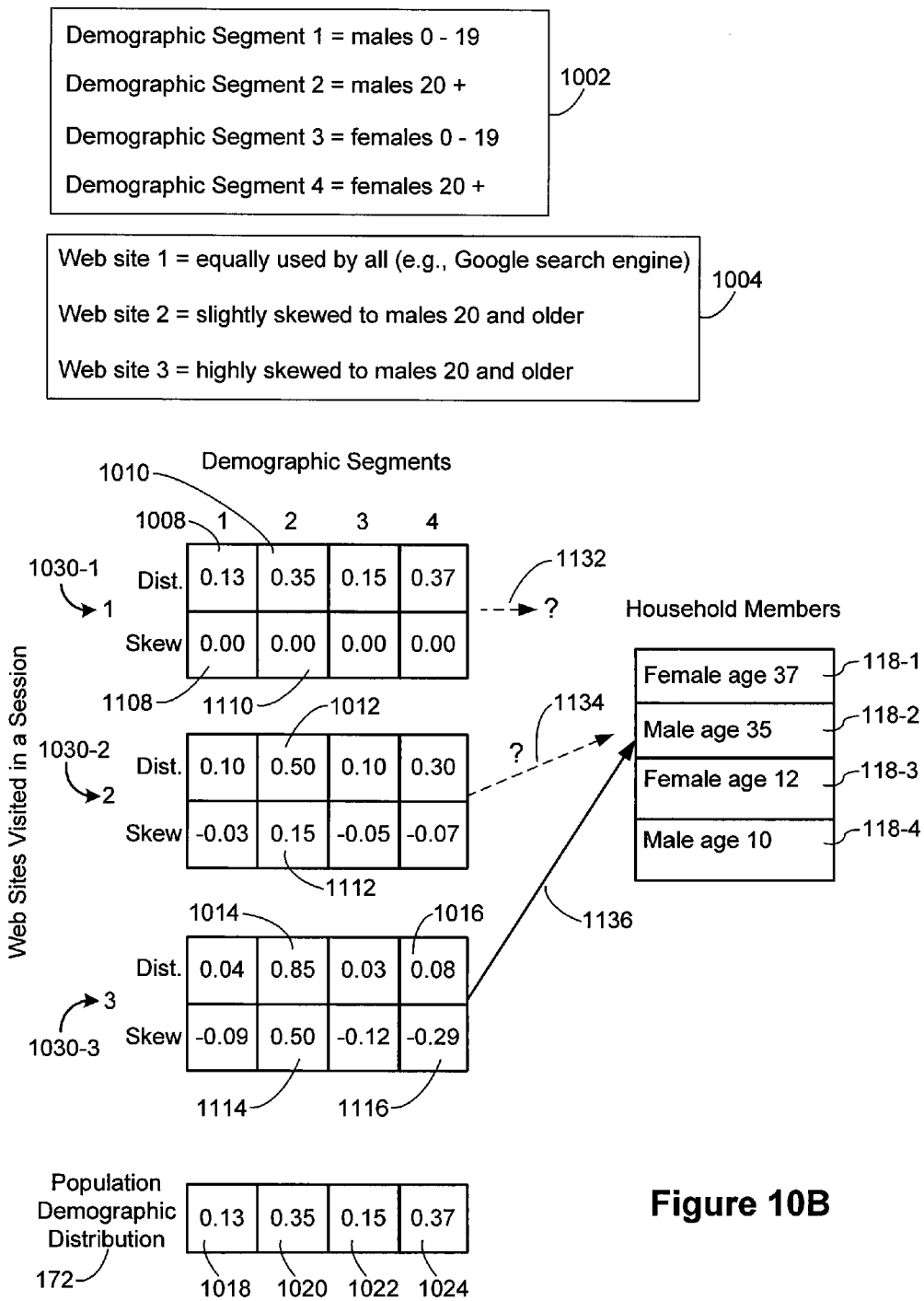

SYSTEMS AND METHODS FOR ASSOCIATING INDIVIDUAL HOUSEHOLD MEMBERS WITH WEB SITES VISITED

RELATED APPLICATIONS

This application claims priority under 35 U.S.C. 119(e) to U.S. Provisional Patent Application Ser. No. 61/482,139 filed May 3, 2011, entitled "Associating Individual Household Members with Web Sites Visited or Television Programs Viewed," which is hereby incorporated by reference in its entirety.

TECHNICAL FIELD

The disclosed implementations relate generally to television viewing activity and web browsing activity.

BACKGROUND

Television viewers have been watching television programs for more than fifty years. In the beginning, a small number of programs were broadcast over the airwaves, and users selected among those channels. Over time, more television viewers have come to receive their television programs from a satellite network or cable network. In addition to standard programming, satellite and cable networks offer premium channels, pay-per-view programs, and a host of interactive programs. Interactive programs are made possible by a set top box that receives the broadcast signal and also has access to the Internet. Set top boxes may also transmit viewer information back to the television provider, giving the provider more information about what programs people are watching.

Television viewers also access the Internet using computers or other devices. Using the Internet, a user can search for information, shop for clothes, books, electronic equipment, medical supplies, etc., watch videos on YouTube, connect with friends and family on social networking sites, play online games, and engage in lots of other activities.

Without active input from individual household members, the link between television viewing and web browsing is generally at the household level. For example, it can be determined that the household at 123 Main St. watched particular television programs and viewed certain web pages, but the television programs and web pages were not necessarily viewed by the same household member.

Correlating television viewing activity or web activity with an individual household member typically involves a log in/log out mechanism. With a log in/log out system each household member has a unique member ID, and each household member has to log in every time he/she begins watching television or accessing the Internet. The same household member may also have to remember to log out when the session is over. This places a burden on the household members, and there is no guarantee that the household members adhere to the process.

SUMMARY OF THE INVENTION

Most Internet-enabled devices in a household (e.g., computers, MP3 players, game consoles, etc.) share the same IP address (e.g., the IP address of a home router). The IP address is associated with TV account and viewing information for a set top box. Knowing this IP address enables the correlation of Web search logs, media content access logs, etc. (reflecting prior Internet activity by users for the same IP address) with log data of TV viewing information associated with the same account.

By correlating television viewing activity with web activity, it is possible to make suggestions to viewers as to other content of interest, present targeted ads, etc. reflecting preferences/behavior revealed by the combined log information. This correlation also enables providing valuable information to advertisers as to viewing and Internet behaviors of different viewer segments.

In disclosed implementations, the IP address used by a set top box to transmit data back to a television provider (with the user's account id) is linked to web logs (e.g., from ad networks). This enables linking a TV to a computer/household, without burdening a user at the household.

Some implementations correlate television viewing activity and/or web activity with an individual household member without explicit input from the household members. A household first registers to have its web activity and television viewing activity monitored in exchange for some benefit (e.g., monetary compensation, special offers, reduced cost for access to the Internet, parental control tools, etc.). The demographic information includes at least the age and gender of each household member. Using this information provided by the household, some implementations correlate the demographic characteristics of household members with television programs and web sites that are skewed to specific demographic characteristics. The correlation is particularly strong when television programs or web sites are highly skewed (e.g., television programs for 4 year olds) or when multiple web site visits or television programs are grouped into a session and the aggregated skew is high.

In accordance with some implementations, a computer-implemented method executes at a server system with one or more processors and memory. The memory stores one or more programs for execution by the one or more processors. The programs include instructions to receive demographic information for a plurality of members of a household. The demographic information includes at least age and gender. The programs also include instructions to receive web activity information for the household. The programs include instructions to identify one or more web activity sessions from the web activity information and instructions to select one of the web activity sessions. The programs further include instructions to identify one or more web sites visited during the selected web activity session and instructions to access web demographic skew data for at least a subset of the web sites visited. The web demographic skew data for a web site identifies fractions of visitors to the web site from predefined demographic segments. The programs include instructions to associate a first household member with the web activity session. The association is performed, at least in part, by correlating the web demographic skew data of the web sites visited with the demographic information of the first household member.

In accordance with some implementations, a computer-implemented method executes at a server system with one or more processors and memory. The memory stores one or more programs for execution by the one or more processors. The programs include instructions to receive demographic information for a plurality of members of a household. The demographic information includes at least age and gender. The programs include instructions to receive television viewing information for the household and instructions to identify one or more television viewing sessions from the television viewing information. The programs include instructions to select one of the television viewing sessions and instructions to identify one or more television programs tuned during the selected television viewing session. The programs include instructions to access television demographic skew data for at least a subset of the television programs tuned. The television demographic skew data for a television program identifies fractions of viewers of the television program from predefined demographic segments. The programs include instructions to associate a first household member with the television viewing session at least in part by correlating the television demographic skew data of the television programs tuned with the demographic information of the first household member.

In accordance with some implementations, a computer-implemented method executes at a server system with one or more processors and memory. The memory stores one or more programs for execution by the one or more processors. The programs include instructions to receive web activity information for a household. The programs include instructions to identify one or more web activity sessions from the web activity information and instructions to select one of the web activity sessions. The programs include instructions to identify one or more web sites visited during the selected web activity session and instructions to access web demographic skew data for at least a subset of the web sites visited. The web demographic skew data for a web site identifies fractions of visitors to the web site from predefined demographic segments. The programs include instructions to infer the existence of a first household member whose demographic characteristics correspond to a highest aggregated demographic skew of the web sites visited during the selected web activity session.

In accordance with some implementations, a computer-implemented method executes at a server system with one or more processors and memory. The memory stores one or more programs for execution by the one or more processors. The programs include instructions to receive television viewing information for a household and instructions to identify one or more television viewing sessions from the television viewing information. The programs include instructions to select one of the television viewing sessions and instructions to identify one or more television programs tuned during the selected television viewing session. The programs include instructions to access television demographic skew data for at least a subset of the television programs tuned. The television demographic skew data for a television program identifies fractions of viewers of the television program from predefined demographic segments. The programs also include instructions to infer the existence of a first household member whose demographic characteristics correspond to a highest aggregated demographic skew of the television programs tuned during the selected television viewing session.

In accordance with some implementations, a computer-implemented method executes at a server system with one or more processors and memory. The memory stores one or more programs for execution by the one or more processors. The programs include instructions to receive demographic information for a plurality of members of a household. The demographic information includes at least age and gender. The programs include instructions to receive web activity information for the household and instructions to identify one or more web sites visited from the web activity information. The programs include instructions to select one of the web sites visited and instructions to access web demographic skew data for the selected web site. The web demographic skew data for the web site identifies fractions of visitors to the web site from predefined demographic segments. The programs include instructions to associate a first household member with the selected web site at least in part by correlating the web demographic skew data of the selected web site with the demographic information of the first household member.

In accordance with some implementations, a computer-implemented method executes at a server system with one or more processors and memory. The memory stores one or more programs for execution by the one or more processors. The programs include instructions to receive demographic information for a plurality of members of a household. The demographic information including at least age and gender. The programs include instructions to receive television viewing information for the household and instructions to identify one or more television programs tuned from the television viewing information. The programs include instructions to select one of the television programs tuned and instructions to access television demographic skew data for the selected television program. The television demographic skew data for the selected television program identifies fractions of viewers of the television program from predefined demographic segments. The programs include instructions to associate a first household member with the selected television program at least in part by correlating the television demographic skew data of the selected television program with the demographic information of the first household member.

Some implementations provide multiple advantages. Among the advantages are better media planning.

Companies want to maximize the reach of TV and web advertising within a budget, so having more precise data about who is watching the television programs or accessing the web allows advertisers to avoid redundant advertising. For example, it allows for better calculation of optimal frequency for running advertisements. In some implementations, a cookie at a client computer tracks how many times an individual household member views an advertisement, and limits that number. If a different household member begins to use the computer, the same advertisement may be displayed again. By tracking individual household members, an advertiser can also allocate different portions of its budget to different demographic segments of the population. For example, advertisements for products that are primarily used by women over 30 could be displayed only when the household member at the computer is in that demographic group.

Another advantage of some implementations is providing better reporting of viewership information. For example, when an advertiser runs an ad campaign, the advertiser would like to know how successful it was. By providing more detailed information about individual household members, advertisers can better evaluate the success of the campaign for various demographic groups. Also, by combining the detailed information about household members with both television viewing and online web activity, advertisers can more accurately determine if television advertising actually led to household members viewing a corresponding web site.

By associating an individual household member with specific web activity or television viewing, some implementations provide suggestions to the household members for other web sites, television programs, or information items. Some implementations provide targeted advertising to individual household members based on the association. In some implementations, the association of individual household members to web site visits or television programs also results in updating the demographic information of household members. For example, based on web activity, it may be discovered that a specific household member has an interest in antiques. This additional demographic information (the interest in antiques) may be used directly (e.g., to provide television program or web site suggestions or for targeted advertising) or indirectly (e.g., by correlating future web activity regarding antiques to this household member). The association of an individual household member to specific web activity or television viewing also provides better information for viewership statistics. For example, this association can provide better statistics for viewership by members of demographic groups. Furthermore, detailed information of web activity and television viewing provides a feedback loop that can improve the stored skew statistics. Once some skew statistics are known, they can be iteratively improved.

BRIEF DESCRIPTION OF THE DRAWINGS

FIG. 8 illustrates an exemplary set of demographic segments of the population in accordance with some implementations.

FIGS. 10A and 10B illustrate the demographic skew of a sample set of web sites in accordance with some implementations.

Like reference numerals refer to corresponding parts throughout the several views of the drawings.

DESCRIPTION OF IMPLEMENTATIONS

To provide better viewership reporting, more accurate suggestions for content, and/or better targeted advertising, it is useful to correlate television viewing activity and/or web activity with an individual household member. Households register to have their activity monitored in exchange for some benefit (e.g., personalized content, special access, monetary compensation, special offers, reduced cost for access to the Internet, parental control tools, etc.). The demographic information includes at least the age and gender of each household member. Rather than burdening the individual users with tracking their individual activity, disclosed implementations use the demographic information provided by the household to correlate specific household members with television programs and web sites. Some implementations correlate household members to television programs and web site visits using the demographic skew of the television programs and web sites. The correlation is particularly strong when television programs or web sites are highly skewed (e.g., television programs for 4 year olds) or when multiple web site visits or television programs are grouped into a session and the aggregated skew is high. Reference will now be made in detail to implementations, examples of which are illustrated in the accompanying drawings.

Figure 1A:
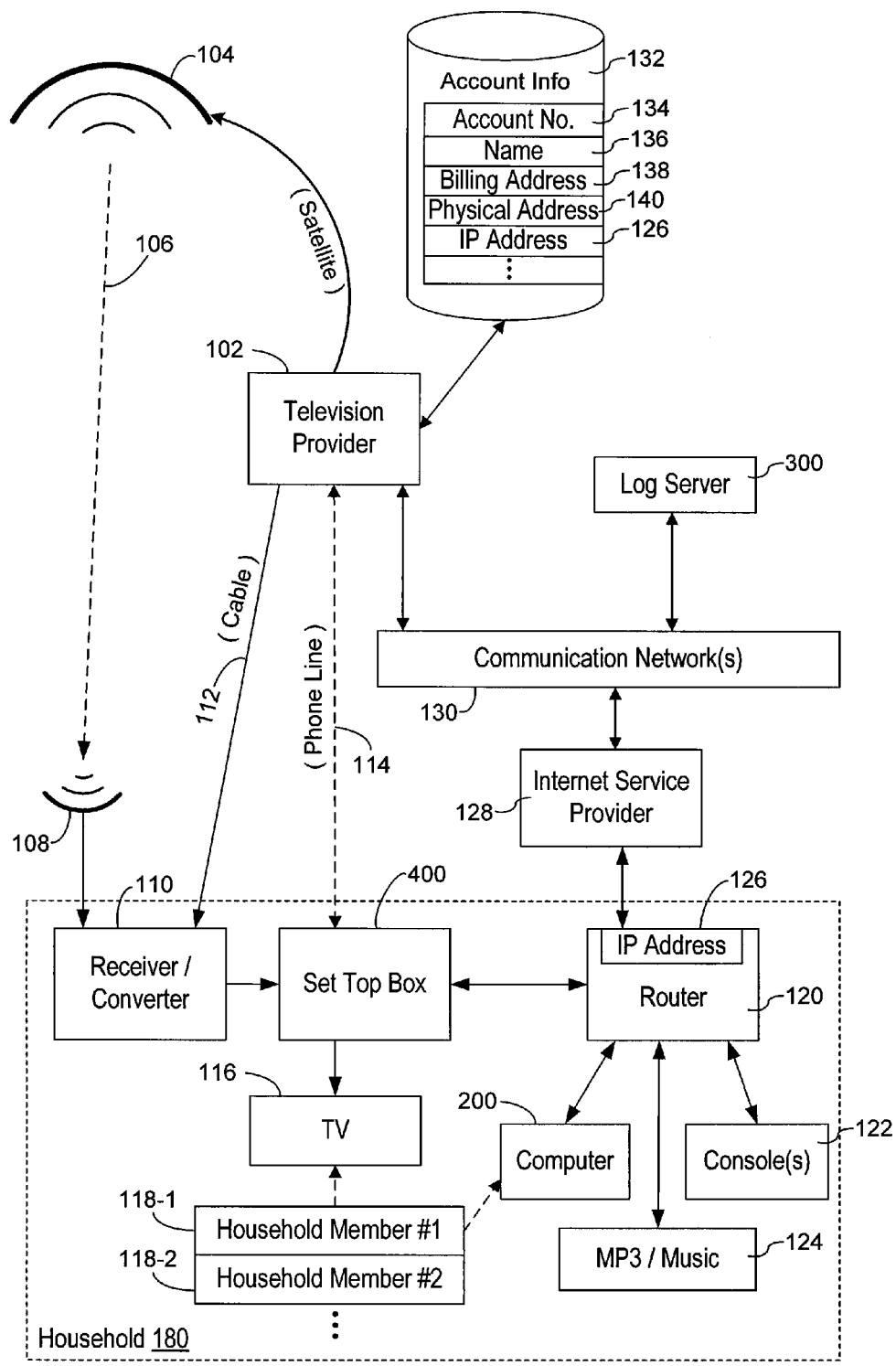
FIGS. 1A and 1B are block diagrams of a system that correlates household members with web activity or television viewing activity in accordance with some implementations.
Figure 1B:
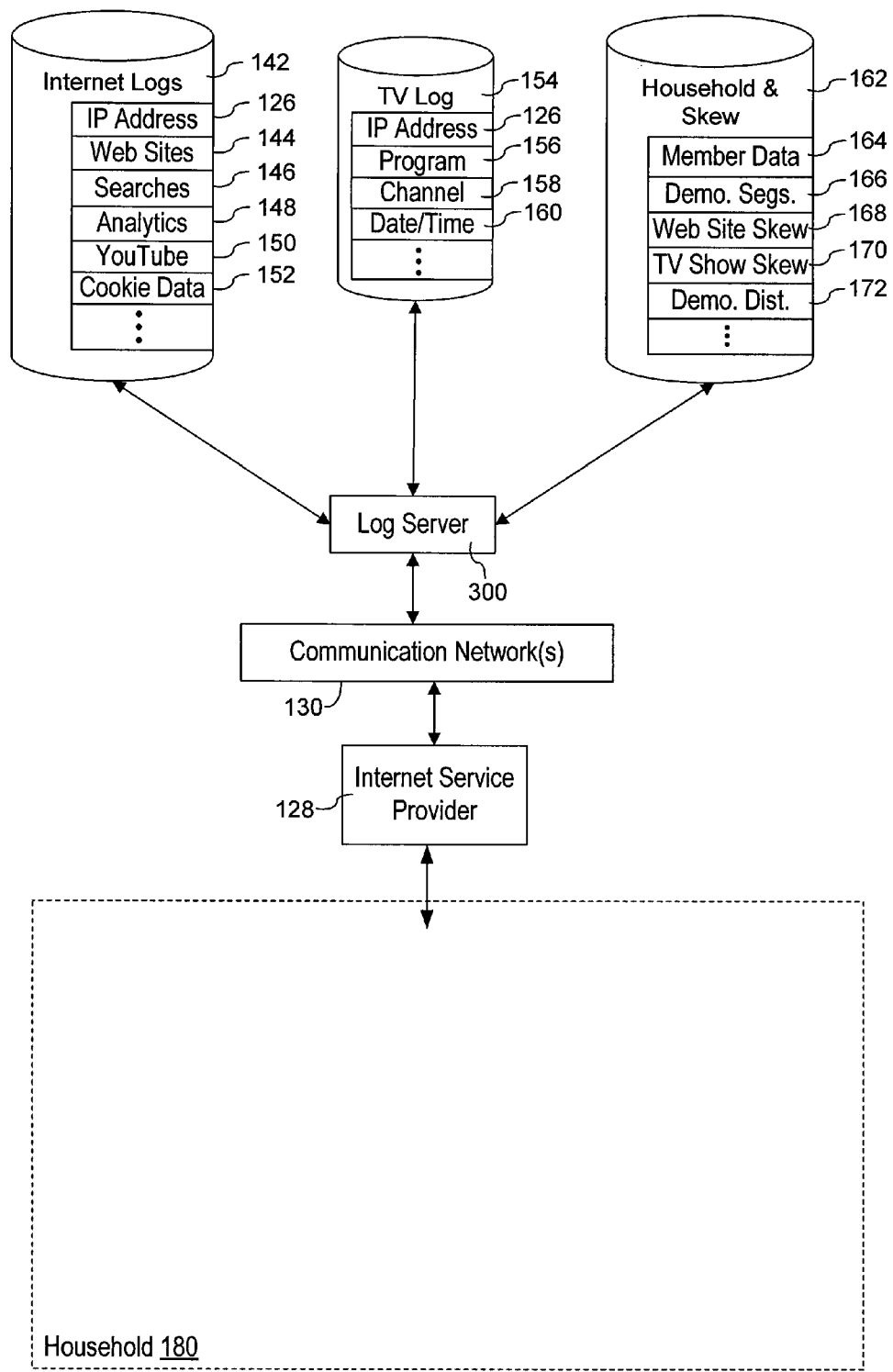

Implementations illustrated in FIGS. 1A and 1B can be used to correlate web browsing activity with television viewing activity and/or correlate a specific household member with either web browsing activity or television viewing activity. In some implementations, the television provider 102 maintains an account in an Account Information database 132 for each household 180. The account information generally includes an account number 134, a name 136, and a billing address 138. In some implementations, the account information also includes a physical address 140, which may be a residence address. In order to enable more features, the provider 102 may also track the IP address 126 of the household 180. In some cases, the household 180 has a fixed IP address 126, in which case the single fixed IP address 126 is associated with the account. In other cases, the subscriber has a dynamic IP address, which can change on a regular basis (e.g., every time the user "dials up" the Internet service provider 128 (ISP)). In some implementations, the television provider 102 tracks the changes to the household's IP Address 126, at least when a household member 118 at the household 180 is viewing television programs.

In some implementations, the television viewing activity at the household 180 is tracked in a TV log database 154. In some implementations, the viewing activity includes every program viewed by the household. In other implementations, the viewing activity tracked includes only programs that are viewed at least a threshold amount of time (e.g., 1 minute or 5 minutes). In some implementations, the viewing activity tracked includes only premium content. The TV viewing activity that is tracked generally includes the program 156, the channel 158, and the date/time 160 of the viewing. When the IP address 126 is available, it is generally included in the TV log data.

The television provider 102 transmits the television programs to the household 180 over a cable 112, by transmission from a satellite 104, or by streaming over the Internet (described below). In the case of satellite transmissions 106, the household 180 has an antenna 108 to receive the signal. At the household 180 there is a receiver or converter 110 to process or decode the incoming signals. The television signals are transmitted to a set top box 400, which allows household members 118 to control what is being displayed on the television 116. In some implementations, the receiver/converter 110 is combined with the set top box 400. In general, a household member, such as member 118-1 or 118-2 controls the set top box 400 with a remote control device. In some implementations, there is additional communication between the television provider 102 and the set top box 400 over a telephone line 114. For example, the set top box may provide information about what television programs are being viewed, or may receive further information for interactive television programs.

In some implementations, the viewing activity is identified by the receiver/converter 110, and transmitted to the television provider 102 through the set top box 400, which is connected to the communication network 130 (e.g., the Internet) through a home router 120. In other implementations, the set top box 400 is able to ascertain the program viewed by evaluating the signal received from the receiver/converter 110. In these implementations, the set top box transmits the viewing information (e.g., program, channel, date/time, etc.) to the television provider 102, again via the household router 120. Because the viewing information is transmitted through the household router 120, the IP address 126 of the router can be transmitted to the television provider 102 along with the viewing information. In some implementations the IP address 126 and/or viewing information is transmitted to the television provider 102 on a periodic basis (e.g., once a day). When the viewing information is transmitted periodically, the data is stored in the set top box 400 between transmissions. As noted above, in some alternative implementations, the set top box 400 transmits data to the television provider 102 over a phone line 114. In some of these implementations, the set top box 400 is able to retrieve the IP address 126 from the router and transmit it with the viewing data.

In some implementations, the household connection to the Internet uses a distinct modem (e.g., DSL modem or cable modem) and an internal router (this configuration is not shown in FIGS. 1A and 1B). In this case, the IP address 126 of the household 180 is the IP address 126 of the modem, which uniquely identifies the household 180 to the "outside world." (In this case the IP address of the router 120 would be relevant only to the internal household network.) In the implementation shown in FIG. 1, the router and modem are combined in the single box labeled "Router."

The actual television program signals are generally transmitted by satellite 104 or over a cable 112. In some implementations, the television programs are streamed over the communications network 130, such as the Internet. In these implementations, the process of selecting a television program may be performed by a computer 200, the set top box 400, or a receiver/converter 110 that is connected directly to the household router 120 (not shown in FIG. 1).

The home router 120 is the gateway to the Internet from the household 180. The router 120 has one external IP address 126, and that is the IP address that is relevant to various implementations described herein. Internally, the router 120 is connected to the set top box 400, and in some cases to any number of computers 200, digital audio players 124, or game consoles 122, such as XBOX, PLAYSTATION or WII. The router 120 is connected to the communication network 130 through an Internet service provider 128. The Internet service provider 128 assigns the IP address 126 to the home router 120. As noted before, the IP Address 126 can be static (fixed) or dynamic (changing). In general, dynamic IP addresses change only when the connection between the router and the Internet service provider 128 is broken (e.g., when using a dial-up modem).

The computers 200 in the household 180 can access the Internet to perform a myriad of activities, such as searching for data (e.g., using a search engine), shopping, viewing videos online (e.g., on YouTube), playing online games, participating in online social networks, or engaging in many other activities. Some of these web browsing activities are logged on one or more log servers 300 in an Internet log database 142. For example, the log 142 may track web site visits 144 or search queries 146. Many other Internet activities are logged, such as online shopping conversions and viewing advertisements. In addition, many web sites track browsing 148 on their sites using Google Analytics. Web browsing activities are generally tracked by the IP Address 126 of the household 180 because it is readily available and it is a unique identifier (at least at a specific point in time). In some implementations, there is specific tracking for visits to YouTube 150 or other particular sites of interest. In some implementations, the Internet log 142 includes cookies 152 that are downloaded during the web activity.

In order to correlate individual household members 118 to specific web site visits or television programs viewed, the log server 300 also accesses a Household and Skew database 162 that maintains household member information 164 and other demographic information. The other demographic information includes a table of demographic segments 166. An exemplary set of demographic segments is illustrated in FIG. 8. Generally the demographic segments partition the population into non-overlapping demographic groups. In some implementations, the demographic segments are determined by at least gender 812 and age ranges 810. The other demographic information includes web site demographic skew information 168. The web site skew information 168 identifies what portion of visits to each web site are performed by each demographic segment. This is described in more detail in reference to FIGS. 9, 10A, and 10B. An analogous set of television skew information 170 is maintained for television programs. In addition, the database 162 includes demographic distribution data 172 for the relevant population. This is described below in reference to FIG. 9.

One of skill in the art would recognize that the data identified in Internet log database 142, TV log database 154, and household/skew database 162 could all be in a single database, or distributed to a different number of databases depending on the implementation. For example, the household member information 164 might be in a different database than the demographic skew data 168 and 170.

Figure 2:
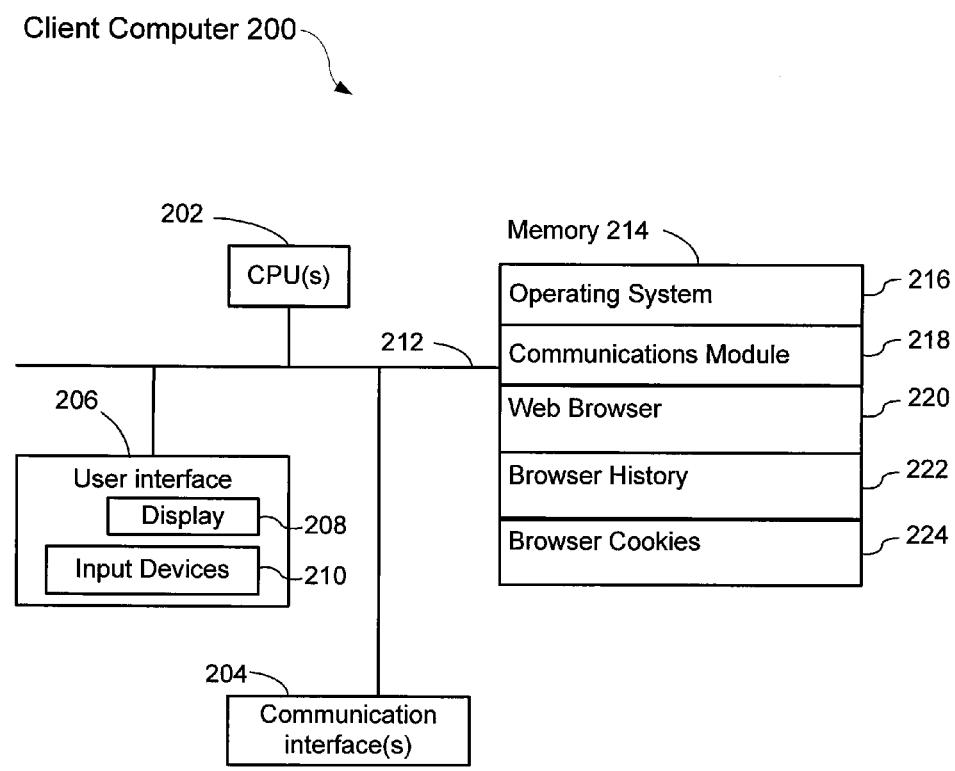
FIG. 2 is a functional block diagram of a client household computer in accordance with some implementations.

FIG. 2 illustrates a typical client computer 200 at a household 180. A client computer 200 generally includes one or more processing units (CPUs) 202, one or more network or other communications interfaces 204, memory 214, and one or more communication buses 212 for interconnecting these components. The communication buses 212 may include circuitry (sometimes called a chipset) that interconnects and controls communications between system components. A client computer 200 includes a user interface 206, for instance a display 208 and one or more input devices 210, such as a keyboard and a mouse. Memory 214 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may include mass storage that is remotely located from the central processing unit(s) 202. Memory 214, or alternately the non-volatile memory device(s) within memory 214, comprises a computer readable storage medium. In some implementations, memory 214 or the computer readable storage medium of memory 214 stores the following programs, modules and data structures, or a subset thereof:

an operating system 216 (e.g., WINDOWS or MAC OS X) that generally includes procedures for handling various basic system services and for performing hardware dependent tasks;

a network communications module 218 that is used for connecting the client computer 200 to servers or other computing devices via one or more communication networks, such as the Internet, other wide area networks, local area networks, metropolitan area networks, and the like;

a web browser 220, which allows a user of the client computer 200 to access web sites and other resources over the communication network;

browser history 222, which records for members 118 of a household 180 all sites visited during one or more browsing sessions. This information can be associated with individual household members 118 if the members log in to the computer(s) 200 prior to a browsing session, or can be associated with the household 180 as a whole if the household members 118 do not log in to individual accounts; and one or more cookies 224, which provide persistent data for web sites visited by a household member 118 at the client computer 200.

Figure 3:
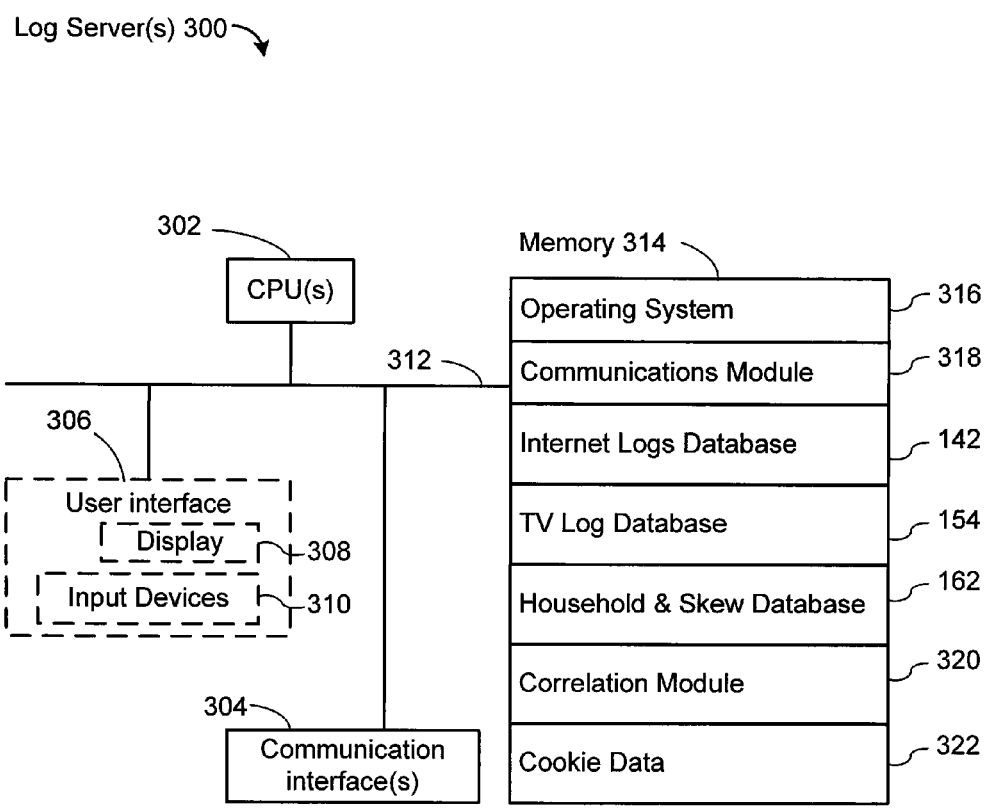
FIG. 3 is a functional block diagram of a log server in accordance with some implementations.

Referring to FIG. 3, the log server 300 generally includes one or more processing units (CPUs) 302, one or more network or other communications interfaces 304, memory 314, and one or more communication buses 312 for interconnecting these components. The communication buses 312 may include circuitry (sometimes called a chipset) that interconnects and controls communications between system components. The log processor 300 may optionally include a user interface 306, for instance a display 308 and a keyboard 310. Memory 314 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may include mass storage that is remotely located from the central processing unit(s) 302. Memory 314, or alternately the non-volatile memory device(s) within memory 314, comprises a computer readable storage medium. In some implementations, memory 314 or the computer readable storage medium of memory 314 stores the following programs, modules and data structures, or a subset thereof:

an operating system 316 (e.g., LINUX or UNIX) that generally includes procedures for handling various basic system services and for performing hardware dependent tasks;

a network communications module 318 that is used for connecting the log server 300 to servers or other computing devices via one or more communication networks, such as the Internet, other wide area networks, local area networks, metropolitan area networks, and the like;

one or more Internet Logs databases 142, which stores information about online web browsing activity. The logs include the IP address 126 of the household 180. The browsing activity can include web sites visited, web searches, information collected by analytics systems, such as Google Analytics, viewing YouTube videos, cookie data, online shopping, etc. The information in the Internet Logs databases 142 can be derived from many sources, including the browser history 222 and browser cookies 224 collected and reported by a client computer 200, search history provided by a toolbar on the client computer 200, and activity logs for sites, such as YouTube.com. The information for the Internet Logs databases 142 may also be collected from the ISP 128, because all Internet activity is routed through the ISP 128. It is possible for much of this information to be collected passively, with or without specific approval of the household members 118. However, it is more common for household members to agree to provide this information as members of a panel to measure television viewership and associated Internet activity.

a TV log database 154, which stores information about household television viewing activity. The log 154 generally includes program names 156 (if known), channel 158, and date/time 160. The log 154 also includes the IP address 126 of the household 180 when available;

a correlation module 320 which correlates television viewing activity with web browsing activity and/or correlates individual web site visits or viewed television programs with specific household members 118; and a cookie data database or file store 322. When a household registers to have its web activity tracked, a cookie data database or file store 322 tracks cookie data from web sites visited by a household member 118.

The correlation module 320 may also convert the information from the log entries in databases 142 and 154 into aggregated data. In some implementations, the log data correlation module 320 processes the IP or web address 126 to determine geographic information, such as country, state and city.

Although FIG. 3 shows a log server 300, FIG. 3 is intended more as a functional illustration of the various features that may be present in a set of servers than as a structural schematic of the implementations described herein. In practice, and as recognized by those of ordinary skill in the art, items shown separately could be combined and some items could be separated. For example, some items shown separately in FIG. 3 could be implemented on a single server and single items could be implemented by one or more servers. The actual number of servers used to implement a log server 300, and how features are allocated among them will vary from one implementation to another, and may depend in part on the amount of data traffic that the system must handle during peak usage periods as well as during average usage periods.

Figure 4:
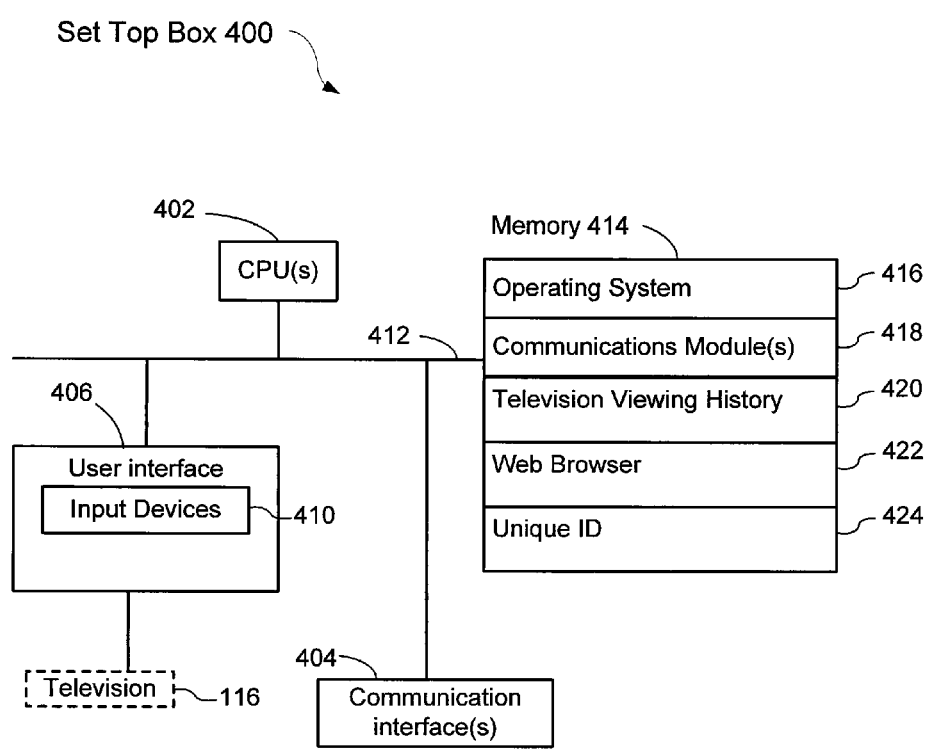
FIG. 4 is a functional block diagram of a television set top box in accordance with some implementations.

FIG. 4 illustrates an exemplary set top box 400 in accordance with some implementations. A set top box 400 is similar to a computer, having one or more CPU's 402 and memory 414. The set top box includes multiple communications interfaces 404, enabling connection to a receiver/converter 110, connection to a television 116, and connection to a home network (usually a router 120). The user interface 406 of the set top box 400 is the television 116 and a remote control device 410. Of course the television 116 is generally a separate component, and not an integrated portion of the set top box 400. In some implementations, the set top box 400 also includes a keyboard as an input device.

A set top box includes one or more communication buses 412 for interconnecting these components. The communication buses 412 may include circuitry (sometimes called a chipset) that interconnects and controls communications between system components. Memory 414 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 414 may include mass storage that is remotely located from the central processing unit(s) 402. Memory 414, or alternately the non-volatile memory device(s) within memory 414, comprises a computer readable storage medium. In some implementations, memory 414 or the computer readable storage medium of memory 414 stores the following programs, modules and data structures, or a subset thereof:

- an operating system 416 (e.g., LINUX, UNIX, or a proprietary operating system) that generally includes procedures for handling various basic system services and for performing hardware dependent tasks;
- a network communications module 418 that is used for connecting the set top box 400 to a home network router 120 and receiver/converter 110;
- a database or file system to store television viewing history 420;
- in some implementations, the set top box 400 includes a web browser 422, so that a household member 118 can utilize a television 116 to access the Internet; and
- in some implementations, the set top box 400 stores a unique ID 424, which uniquely identifies the set top box 400.

Each of the methods described herein may be performed by instructions that are stored in a computer readable storage medium and that are executed by one or more processors of one or more servers or clients. Each of the operations shown in FIGS. 1-4 may correspond to instructions stored in a computer memory or computer readable storage medium.

Both television viewing activity and web usage activity are useful indicators of future activities of an individual household 180 as well as aggregate trends. Combining these two disparate types of data can provide even more valuable information. In order to do this, the data from television viewing has to be correlated to web usage activity for the same household, or even the same user. Associating TV viewing data with web usage data on a per household/per user basis can be made possible by recognizing that, at any given time, most or all Internet-enabled devices in a household will access the Internet through a common router 120 and, as a result, share a common IP Address 126. The IP Address 126 can be static or dynamic. When the IP Address 126 is dynamic (e.g., when the IP Address is assigned dynamically by an ISP 128 using DHCP), the IP Address 126 for the household 180 can be logged at a web server (such as the log server 300 or the TV provider 102 illustrated in FIG. 1). By having point in time data for both television viewing and web activity, the two sources of data can be correlated.

Figure 6:
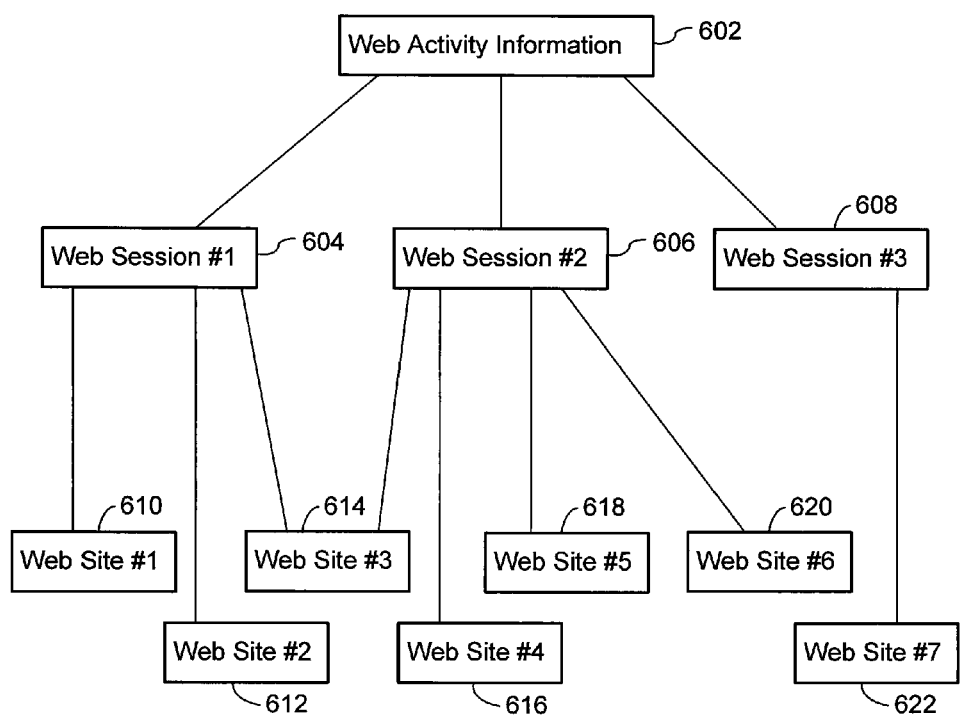
FIG. 6 illustrates the hierarchical structure of web activity in accordance with some implementations.

FIG. 6 illustrates an exemplary way to group together web activity information 602. The web activity 602 comprises visits to various web sites, such as web site #1 (610) and web site #2 (612). However, the web activity 602 generally falls into "sessions," each of which includes one or more traversals (e.g., a sequence of web page visits that occur as a user browses from site to site, sometimes with the use of a search engine to identify sites to visit). For example, one household member 118-1 may sit at a computer 200 and access various web sites for an hour. This entire hour may be characterized as a single session if there is an identifiable beginning and an end. The browser history 222 may identify the beginning and the end of a session. In some implementations, the hour could be split into multiple sessions based on other factors, such as the types of activity (e.g., reading email versus looking at news or a YouTube video) or the website content (e.g., websites related to sports versus online shopping). After one session, there may be no web activity for several hours (e.g., while the household members 118 are at work or school). Later, there may be a session that lasts only a few minutes (e.g., to look up a map). In many cases, sessions are identified by spans of time in which there is reasonably continuous activity. In some implementations, sessions may also be identified by a change in the web activity. For example, switching from email access to online shopping, or switching from web sites about home improvement to web sites about sports. One of skill in the art will recognize that there are many ways to identify sessions within web activity 602.

In the illustration of FIG. 6, the web activity 602 is subdivided into three web sessions 604, 606, and 608. In some implementations, the sessions are non-overlapping, and form a partition of the web activity 602. Each web session comprises visits to one or more web sites. For example, web session #3 (608) comprises a visit to a single web site 622. Of course two or more distinct sessions can access the same web site, such as web site #3 (614). For example, web site #3 (614) could be www.google.com, with household members 118 executing a Google search in each web session 604 and 606. Although the illustration in FIG. 6 shows only three web sites 610, 612, and 614 in web session 604, and four web sites 614, 616, 618, and 620 in web session 606, typical web sessions may comprise many more web site visits, including multiple visits to the same web site.

Figure 5A:
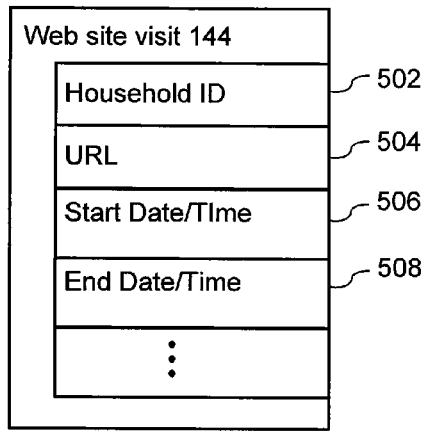
FIG. 5A is an exemplary data structure for storing web site visits from web activity in accordance with some implementations.

FIG. 5A illustrates a data structure to store web site visits 144. The data for a web site visit 144 generally includes a household ID 502, which uniquely identifies the household 180 where the web activity occurred. The data for a web site visit 144 also includes the URL 504, which specifies the web site that was visited. In some implementations, the URL includes the complete URL 504 that was used to access the web site, including all of the URL parameters. In some implementations, the URL is truncated or abbreviated, and stored instead of, or in addition to, the complete URL. For example, an abbreviated URL may omit parameters that do not affect the web site content. The data for a web site visit 144 also includes the start date/time 506 and end data/time 508 for the web site visit. In some instances, the end data/time is not available because there is no clear indicator when the household member 118 "completed" the site visit. (E.g., when the household member 118 just walks away from the computer 200.)

Figure 7:
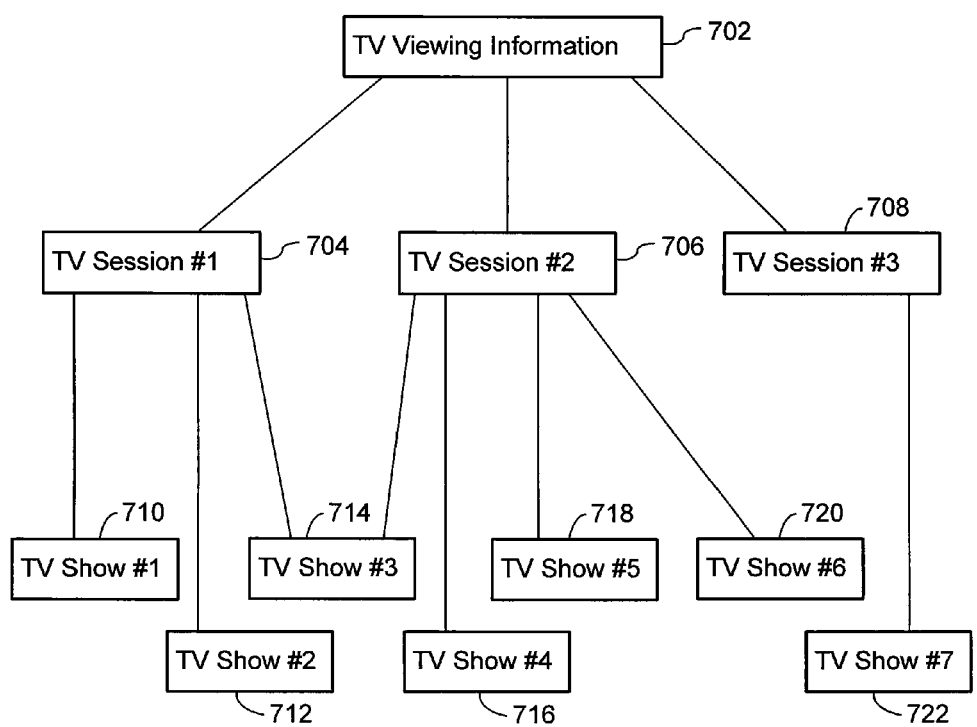
FIG. 7 illustrates the hierarchical structure of television viewing activity in accordance with some implementations.

FIG. 7 is analogous to FIG. 6, but illustrates grouping of television viewing activity 702 into TV sessions. In this illustration, the television viewing activity 702 is split into three television viewing sessions 704, 706, and 708. Each of these television viewing sessions comprises one or more television shows that were viewed (or at least turned on). As with web sites, the same TV show (such as TV show 714) may be included in two or more distinct sessions. In this illustration, TV viewing session 704 includes TV shows 710, 712, and 714, and TV viewing session 706 includes TV shows 714, 716, 718, and 720. TV viewing session 708 includes a single TV show 722. Similar to web site visits, TV shows may be grouped into sessions by time span, time of day, content, and/or other program characteristics.

The correlation of web sites or television shows with specific household members uses demographic characteristics. This correlation requires demographic data for the household members 118 as well as demographic data for the web sites and television programs. Some implementations perform this correlation by dividing the population into predefined demographic segments 166. FIG. 8 illustrates an example of dividing the population into 18 segments based on age ranges 810 and gender 812. For example, segment 802 consists of males age 0-14, segment 804 consists of females age 0-14, segment 806 consists of females age 60-69, and segment 808 consists of males age 85 and older. In this illustrated example, both males and females use the same age ranges, but this is not required. Also, some age ranges may be omitted because they are not relevant, such as infants 2 and under. Although this example of demographic segments is based on just gender 812 and age range 810, segments can be based on additional characteristics, such as ethnicity or education.

Figure 5B:
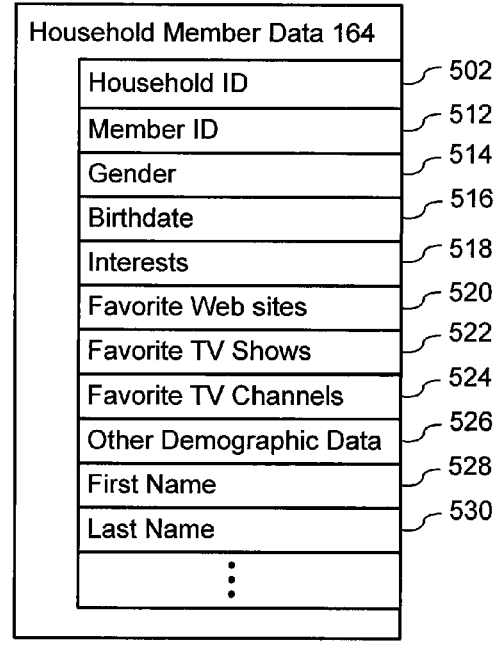
FIG. 5B is an exemplary data structure for storing information for a household member in accordance with some implementations.

FIG. 5B illustrates data that is collected for each household member 118. The household member data 164 includes a household ID 502 as well as a member ID 512. The household ID is the unique ID that identifies the household, and the member ID uniquely identifies each household member 118 within the household 180. The data 164 also includes the member's gender 514 and the member's birth date 516 or age. In some implementations the member's birth date 516 is specified as a month and year only, whereas in other implementations the full birth date 516 is stored. As an alternative, some implementations store the household member's age. This may be less preferred because the person's age changes over time. In some implementations, the member's birth date 516 is saved in an encrypted format to protect the privacy of the household member 118. In some implementations, the household ages are not correlated with a particular household or address when the ages are provided to an outside entity, such as the content provider.

In addition, the household member data 164 can include the interests 518 of the household member, which may be specified as categories or keywords. As used herein, "topical keyword" refers to a word or phrase that is used either as a keyword or as a category. For example, interests could include "world cup soccer" or "renaissance art." Some implementations allow a household member 118 to specify zero or more interests. In some implementations the interests 518 must be selected from a set of predefined interest options, but in other implementations, a household member 118 can specify any interests 518. A household member 118 can also specify favorite web sites 520, favorite TV shows 522, and/or favorite television channels 524. The identified favorites are sometimes referred to as "preferences." Some implementations limit the number of favorites to a predefined number (e.g., 5). The member data 164 can include other demographic data 526 as well, such as ethnicity, occupation, education, memberships in professional organizations, or other data that could be used to correlate a household member 118 with specific web sites or TV shows. In some implementations, the member data 164 also includes a first name 528 and/or last name 530. This basic information about household members is usually collected as part of a registration questionnaire, when a household signs up to have is television viewing and/or web activity tracked.

Some of the demographic information about a household member 118 is subject to change (e.g., interests 518 and favorite web sites 520), whereas other demographic characteristics are for the most part immutable (e.g., gender 514 and ethnicity). In some implementations, the demographic data that is subject to change is updated automatically based on actual activity of each household member. For example, by tracking web sites visited or TV shows that are watched, the interests 518 and/or favorite web sites 520 may be updated. In some implementations, weights are associated with the interests 518, the favorite web sites 520, the favorite TV shows 522, and/or the favorite TV channels 524. In some of these implementations, the weights are subsequently adjusted based on actual usage by each household member. For example, a household member could identify both "The Simpsons" and "Survivor" as favorite TV shows, but actual usage may show that the household member watches "The Simpsons" much more frequently. In some implementations, there is a confidence value associated with each interest, favorite TV show, favorite web site, or favorite TV channel. A confidence value indicates the certainty that the interest, favorite TV show, favorite web site, or favorite TV channel is "correct." Confidence values may be used in addition to, or instead of, weights.

Figure 5C:
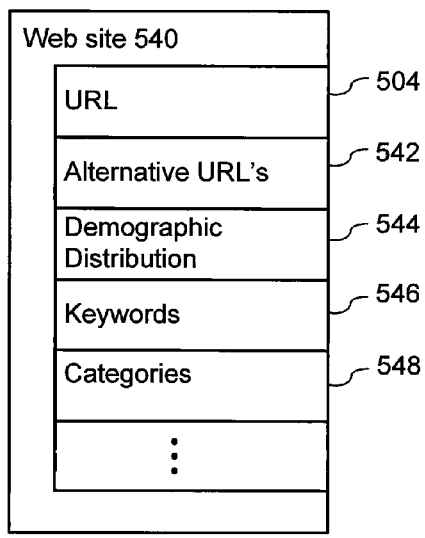
FIG. 5C is an exemplary data structure for storing information about web sites in accordance with some implementations.

FIG. 5C illustrates certain data that may be maintained for each web site 540. In general, each web site 540 is associated with a URL 504. In some cases, the same web site has two or more URL's, including URL's with embedded parameters. In some implementations, a representative URL is selected for the web site, which is the main URL 504 for the web site. Other URL's that link to the same web site 540 may be stored as alternative URL's 542. In some implementations, each distinct URL has a distinct record in a web site table. The demographic distribution 544 of visitors to the web site 540 identifies what fraction of the visitors are from each demographic segment. This is described in more detail below with respect to FIG. 9. The keywords 546 and/or categories 548 specify words or phrases that either appear on the web site 540 or describe the content of the web site 540. Both the keywords 546 and the categories 548 are considered part of "topical keywords."

Figure 5D:
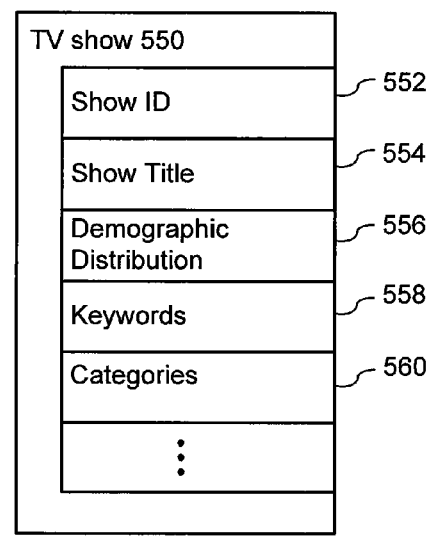
FIG. 5D is an exemplary data structure for storing information about television programs in accordance with some implementations.

FIG. 5D illustrates certain data that may be maintained for each television show 550. As used herein, "television show" and "television program" are used interchangeably, and includes any program that can be viewed on a television. In some implementations, each TV show 550 has a show ID 552 that uniquely identifies the show. In general, each TV show 550 has a show title 554. For a television series with multiple episodes, some implementations maintain a distinct show ID 552 and show title 554 for each episode. In other implementations, there is a single show ID 552 and show title 554 for the entire series. The demographic distribution 556 of viewers of the TV show 550 identifies what fraction of the viewers are from each demographic segment. The keywords 558 and/or categories 560 specify words or phrases that describe the content of the TV show 550. As noted above, both keywords 558 and categories 560 are included in "topical keywords."

Figure 9:
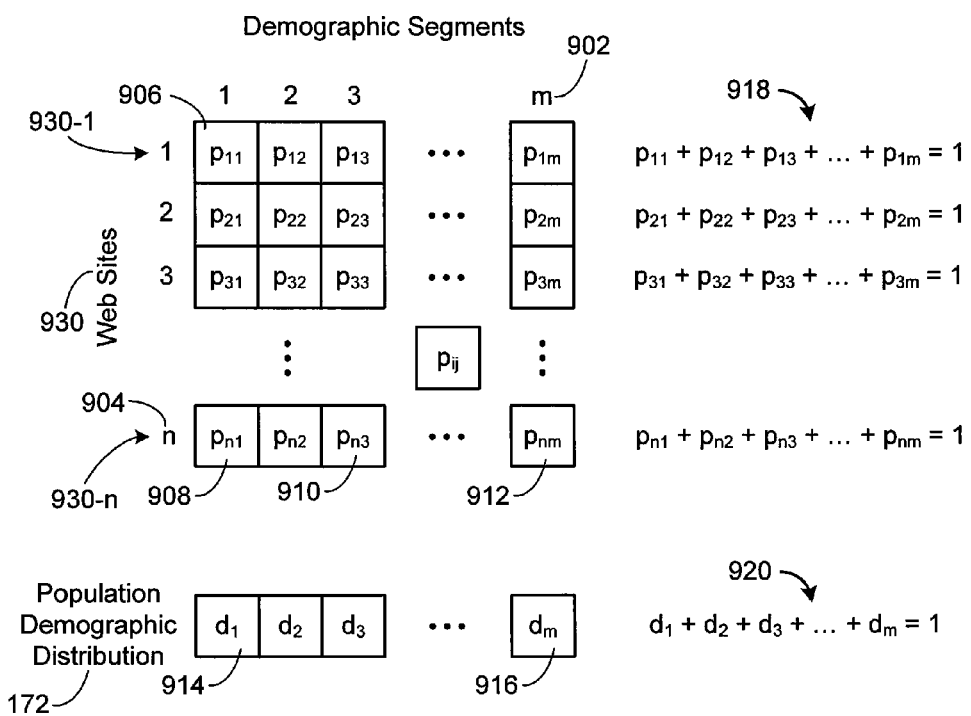
FIG. 9 illustrates the demographic distribution of people accessing certain web sites and the demographic distribution of the population in accordance with some implementations.
Figure 10A:
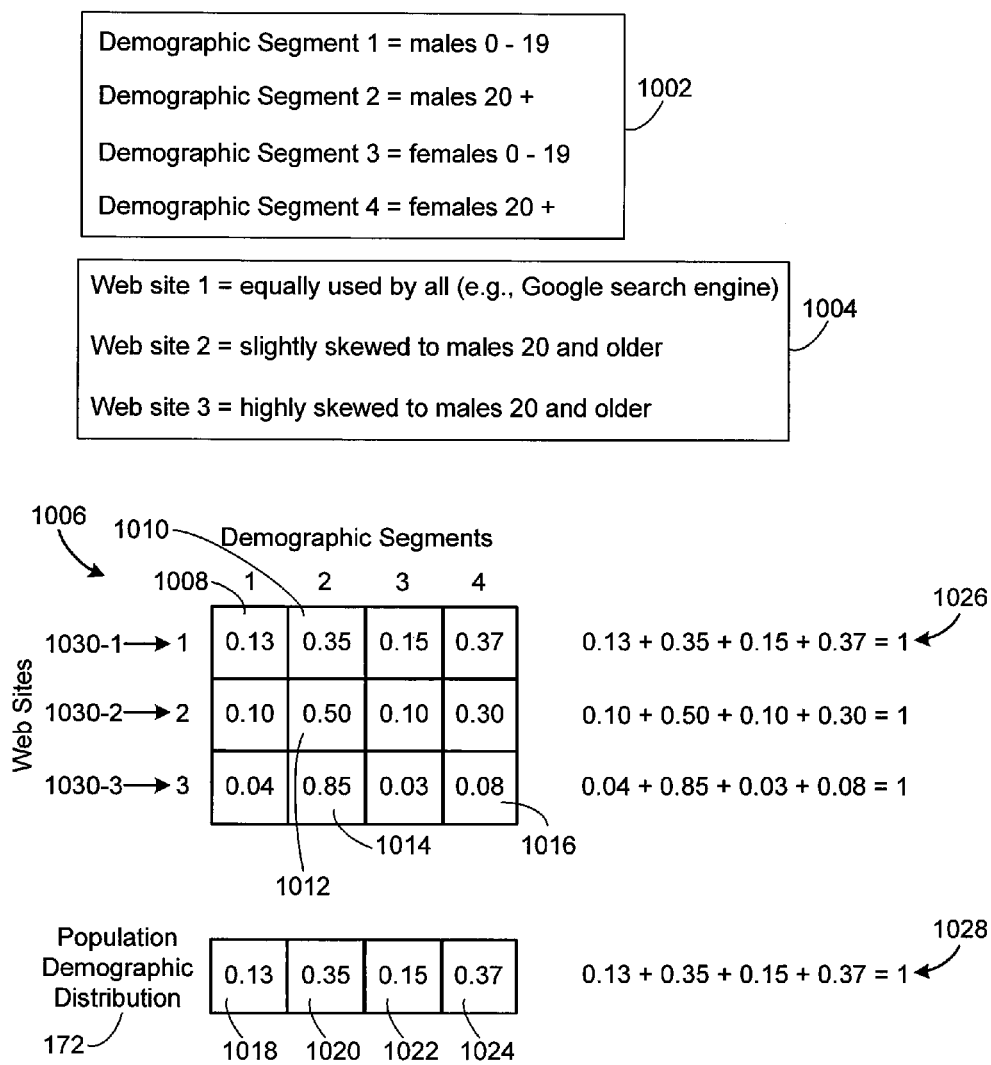

FIGS. 9, 10A, and 10B illustrate one way that individual household members 118 can be associated with specific web site visits or television shows viewed. In the implementation depicted in FIG. 9, there are m (902) distinct demographic segments 166, and n (904) distinct web sites 930. The population has a certain distribution 172 among the demographic segments 166. In the illustrated implementation, a fraction $d_1$ (914) of the population belongs to the first demographic segment, a fraction $d_2$ of the population belongs to the second demographic segment, and so on. As illustrated, a fraction $d_m$ (916) of the population belongs to the last demographic segment (segment m). Because the demographic segments form a partition of the population, the total of the fractions must be 1. This is illustrated as equation 920: $d_1+d_2+d_3+ \ldots +d_m=1$. This population distribution is independent of any web site or television show.

For each web site, there is a demographic distribution of people who visit that web site. For example, consider the first illustrated web site 930-1. The fraction $p_{11}$ (906) identifies the portion of the population that visit the first web site 930-1 who are in the first demographic segment. Similarly, the fraction $p_{12}$ identifies the portion of the population that visit the first web site 930-1 who are in the second demographic segment, and the fraction $p_{1m}$ identifies the portion of the population that visit the first web site 930-1 who are in the mth demographic segment. Because the demographic segments 166 form a partition of the population, the total of all the fractions is 1, namely $p_{11}+p_{12}+p_{13}+\ldots+p_{1m}=1$, as indicated by equation 918. FIG. 9 illustrates the demographic distribution for each web site 930, including the last web site n (930-n). For the nth web site 930-n, the demographic distribution of visitors is specified by the fractions $p_{n1}$ (908), $p_{n2}$, $p_{n3}$ (910), ..., $p_{nm}$ (912). As above for the first web site 930-1, the sum of all the fractions for the nth web site 930-n is 1. Namely, $p_{n1}+p_{n2}+p_{n3}+\ldots+p_{nm}=1$. The demographic distribution of web site visits (or television programs viewed) may be determined from surveys, and may be adjusted based on actual usage (e.g., using the techniques described herein).

In general, the fraction of visitors to web site i who are in demographic segment j is $p_{ij}$. The sum of all the fractions for each web site must be 1, so we have:

$$\sum_i p_{ij} = 1.$$

The information in FIG. 9 identifies the demographic distribution of visitors to web sites, but the same process can be applied to television shows that people watch. For each television show, there is a distribution of the population who watch that television program. In particular, for each demographic segment, there is a fraction of the program viewers in that demographic segment, and the total of all the fractions is 1.

FIGS. 10A and 10B provide a specific simple example of associating a particular household member 118 with a web activity session. In this example, there are only four demographic segments 1002, splitting the population by gender 812 and two age ranges 810. In this example, the age ranges are 0-19, and 20 and over. In this example, the web activity session 1004 includes visits to three web sites. Table 1006 provides data about the demographic distribution for each of the web sites. For web site 1 (1030-1), the demographic distribution of visitors matches the population demographic distribution 172. For example, 13% of the population is in demographic segment 1 (box 1018), and 13% of the visitors to web site 1030-1 are from demographic segment 1 (box 1008). Similarly, 35% of the general population are in demographic segment 2 (box 1020), and 35% of the visitors to web site 1030-1 are from demographic segment 2 (box 1010). The percentages match for demographic segments 3 (box 1022) and segment 4 (box 1024) as well. The visitors to web site 1030-1 are distributed according to the general population, so no demographic group has more interest in this web site that any other demographic group. Although there is probably no actual web site that behaves exactly this way, a web site such as the Google search engine may come close because all people need to perform web searches, regardless of demographic group.

Web sites 1030-2 and 1030-3 demonstrate demographic skew. The term "skew" is used herein to indicate that the demographic distribution for a web site differs from the demographic distribution of the population (172). The more the web site distribution differs from the population demographic distribution, the greater the skew.

Web site 1030-2 is skewed toward demographic segment 2 because 50% of the visitors (box 1012) to web site 1030-2 are in demographic segment 2, whereas only 35% of the population (box 1020) are in demographic segment 2. The percentage of visitors to web site 1030-2 who are in demographic segments 1, 3, and 4 are each less that the corresponding percentage of the population (boxes 1018, 1022, and 1024).

Web site 1030-3 is even more skewed to demographic segment 2, because 85% of the visitors (box 1014) to web site 1030-3 are in demographic segment 2. This is much higher than the 35% of the population (box 1020) in demographic segment 2. Of course, with 85% of the visitors from segment 2, the percentages for demographic segments 1, 3, and 4 are much smaller than the percentages in the population. For example, web site 1030-3 has only 8% of the visitors from segment 4 (box 1016), whereas 37% of the population is from segment 4 (box 1024).

As noted above in FIG. 9, the total of the fractions for each web site or the general population sums to 1. See, for example, equation 918 and 920. In the specific example of FIG. 10, the fractions sum to 1 as well. See, for example, equations 1026 and 1028. One of skill in the art recognizes that the same data can be referenced using fractions (as in FIGS. 9, 10A, and 10B), or using percentages, as in the description above.

FIG. 10B partially duplicates the information in FIG. 10A, but explicitly shows the skew for each of the three web sites and shows how the skews allow the web site visits to be correlated with a specific member 118 of the household 180. Below the distribution data for each web site are the skews, which represent the deviation from the population distribution. In some implementations, the skew for web site i toward demographic segment j is defined to be $p_{ij}-d_j$. For example, the skews for web site 1030-1 are all 0.00 (e.g., boxes 1108 and 1110) because the distribution of visitors to web site 1030-1 match the population demographic distribution 172 (e.g., boxes 1018 and 1020). For web site 1030-2, there is a positive skew for demographic segment 2, and a small negative skew for each of the other demographic segments (see box 1112 for segment 2). For web site 1030-3, there is a large demographic skew for segment 2, and a large negative skew for the other demographic segments (e.g., boxes 1114 and 1116). In some implementations, the skew is computed as a function of the difference between $p_{ij}$ and $d_j$. For example, some implementations square this difference.

In this example, the household 180 has four members 118, one member from each of the four demographic segments. In particular, member 118-1 is a female age 37, and is thus in demographic segment 4. Member 118-2 is a male age 35, who is in demographic segment 2. Member 118-3 is a female age 12, who is in demographic segment 3, and member 118-4 is a male age 10, who is in demographic segment 1.

If a web activity session included only web site 1030-1, there would be no way to assign it to a household member based on demographic information, as indicated by the arrow 1132. On the other hand, if a web activity session includes a visit to web site 1030-2, there is reason to believe that the visit was by household member 118-2 because member 118-2 is in segment 2, web site 1030-2 is skewed to segment 2, and no other member of the household 180 is in segment 2. (The household 180 identified the demographic characteristics of its household members 118 in the registration process.) This is indicated by arrow 1134. Although web site 1030-2 is skewed to segment 2, 50% of the visitors to this web site are in segments 1, 3, and 4 (10%+10%+30%), so correlating the web site visit to household member 118-1 is not certain. Finally, if a web activity session includes a visit to web site 1030-3, there is a high probability that the visit correlates to household member 118-2 because web site 1030-3 is highly skewed to segment 2, and household member 118-2 is the only household member in this segment. This high probability is shown by arrow 1136.

Although web activity need not be grouped into sessions, grouping of web activity into sessions has two advantages. First, aggregated data from multiple web sites can provide greater confidence for the correlation. For example, if the same web activity session includes visits to both web sites 1030-2 and 1030-3, there is an even greater certainty that the session correlates to household member 118-2. Second, once there is a correlation for a web session, even non-skewed web sites can be correlated to specific household members. For example, if all three web sites 1030-1, 1030-2, and 1030-3 are part of a single session, then the visit to web site 1 is correlated to household member 118-2 as a "rider" even though it could not be correlated by itself. In general, there are lots of web sites that are only slightly skewed, so they can be correlated with household members based on the few web sites that are highly skewed.

When there are multiple web site visits within a web activity session, the skews are typically aggregated. In some implementations, the skews for each of the web sites are added together to calculate a total aggregate skew for each demographic segment. For demographic segment j, the total aggregated skew is $$\sum_i (p_{ij} - d_j),$$

where i ranges over the web sites in the web activity session. In some implementations, the aggregated skew is calculated as an average $$\frac{1}{n}\sum_i (p_{ij} - d_j),$$

where n is the total number of web sites in the web activity session. One of skill in the art will recognize that there are other ways to aggregate the skews, such as squaring each individual skew before adding (and accounting for both positive and negative skews). In some implementations, web sites with little skew are omitted from the skew aggregation formula. Once a skew aggregation formula is selected, it is possible to compare the aggregated skews for the various demographic segments. For example, the demographic segment with the highest aggregated skew may be used to correlate a web activity session with an individual household member 118. In some instances, there may be two or more demographic segments with a high aggregated skew. In general, correlation between the web site visits and an individual household member is only possible where there is a high enough confidence that one demographic segment is more probable than the other demographic segments.

The correlation process described in FIGS. 9, 10A, and 10B using demographic segments can be used in conjunction with other techniques. As noted above, FIG. 5B identifies various data for an individual household member 118, such as interests 518 and favorite web sites 520. The interests 518 can be correlated to the keywords 546 or categories 548 associated with a web site 540. For example, interest in sports is fairly broad across many demographic segments, but a particular household 180 may have only a single household member 118 with a designated interest in sports. Using interests facilitates correlation of a household member to a web site visit when demographic distribution alone is inadequate. Also, a household member can identify specific favorite web sites 520, and thus visits to those web sites are likely correlated with that household member.

The correlation process described above with respect to web sites applies to television viewing as well. This process uses the same household member data 164, but uses TV show data 550 rather than web site data 540. In particular, the demographic distribution 556 of TV show viewers is used in the same way as the demographic distribution 544 of web site visitors. As with web activity sessions, television viewing sessions can be correlated to individual household members 118, and the correlation process can be supplemented or enhanced by matching member interests 518 and/or favorite TV shows 522 and/or favorite TV channels 524 with the keywords 558 or categories 560 corresponding to TV shows 550.

The correlation process described above can also be applied dynamically while a household member is viewing a television show 550 or visiting web sites 540 in a web activity session. For example, if the specific household member 118 is identified, better targeted advertising may be provided, and duplication of advertising may be avoided. The identification of the household member could also assist in providing more relevant search results for web searches.

Figure 11A:
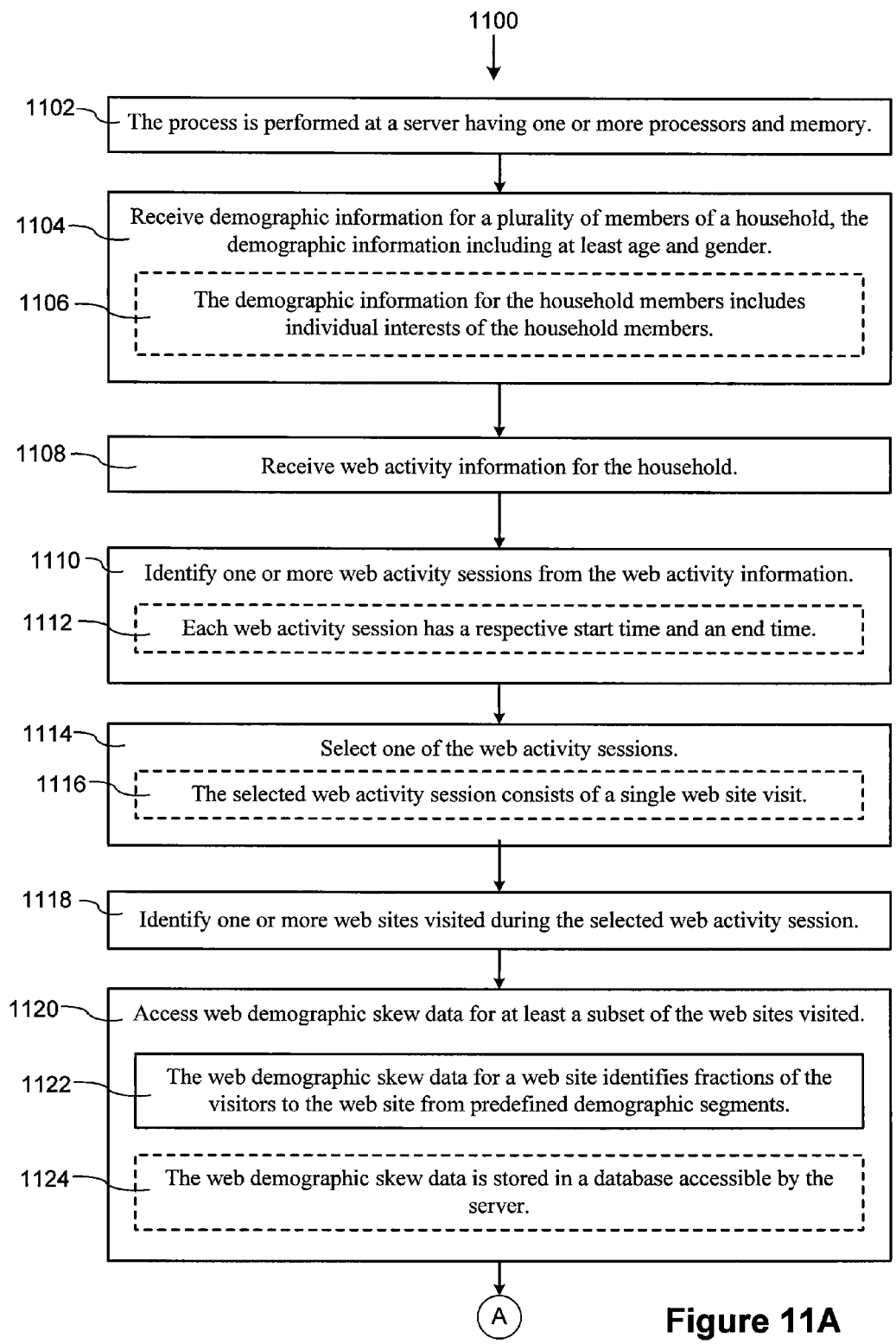
FIGS. 11A-C illustrate an exemplary process for correlating web site visits with an individual household member according to some implementations.
Figure 11B:
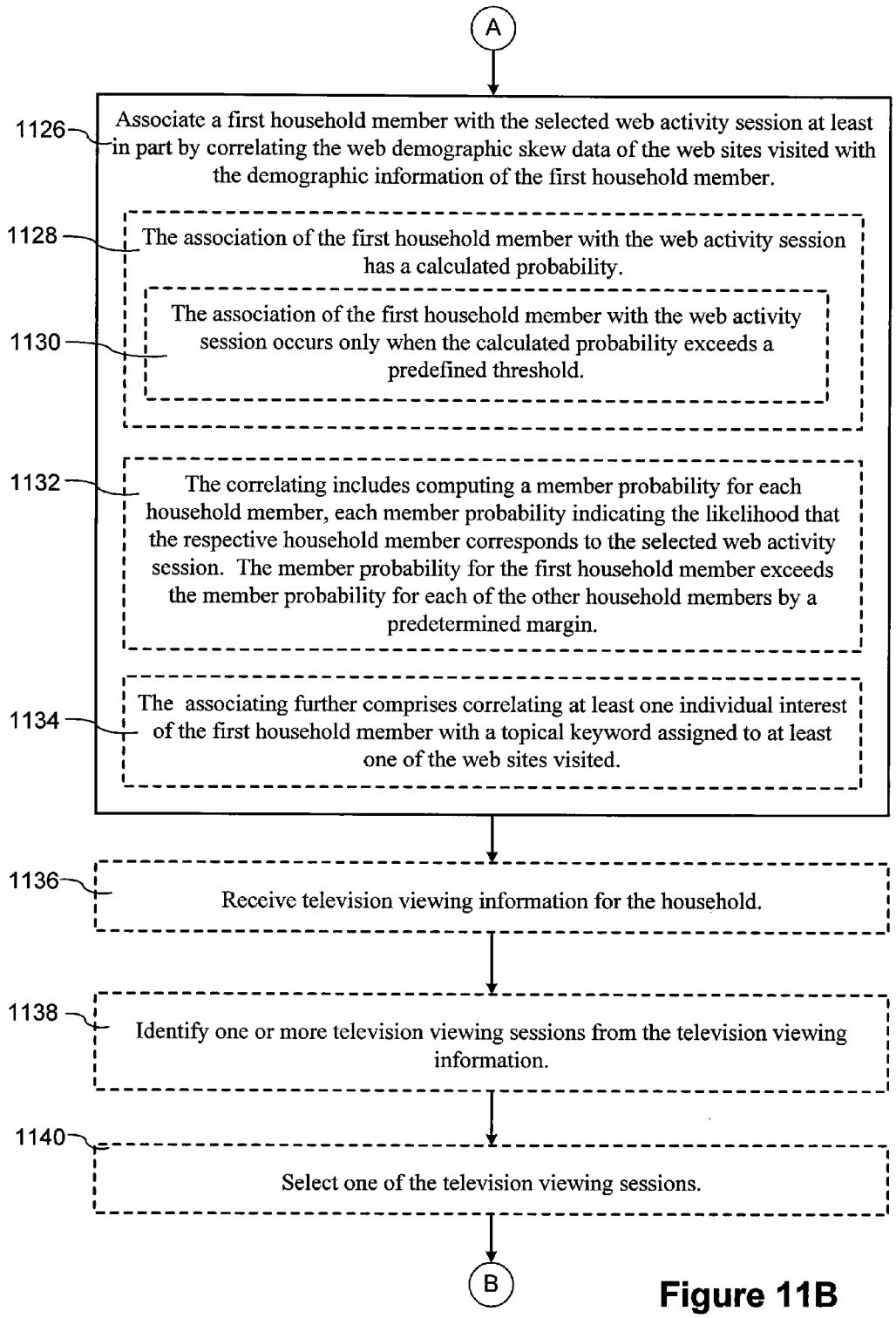
Figure 11C:
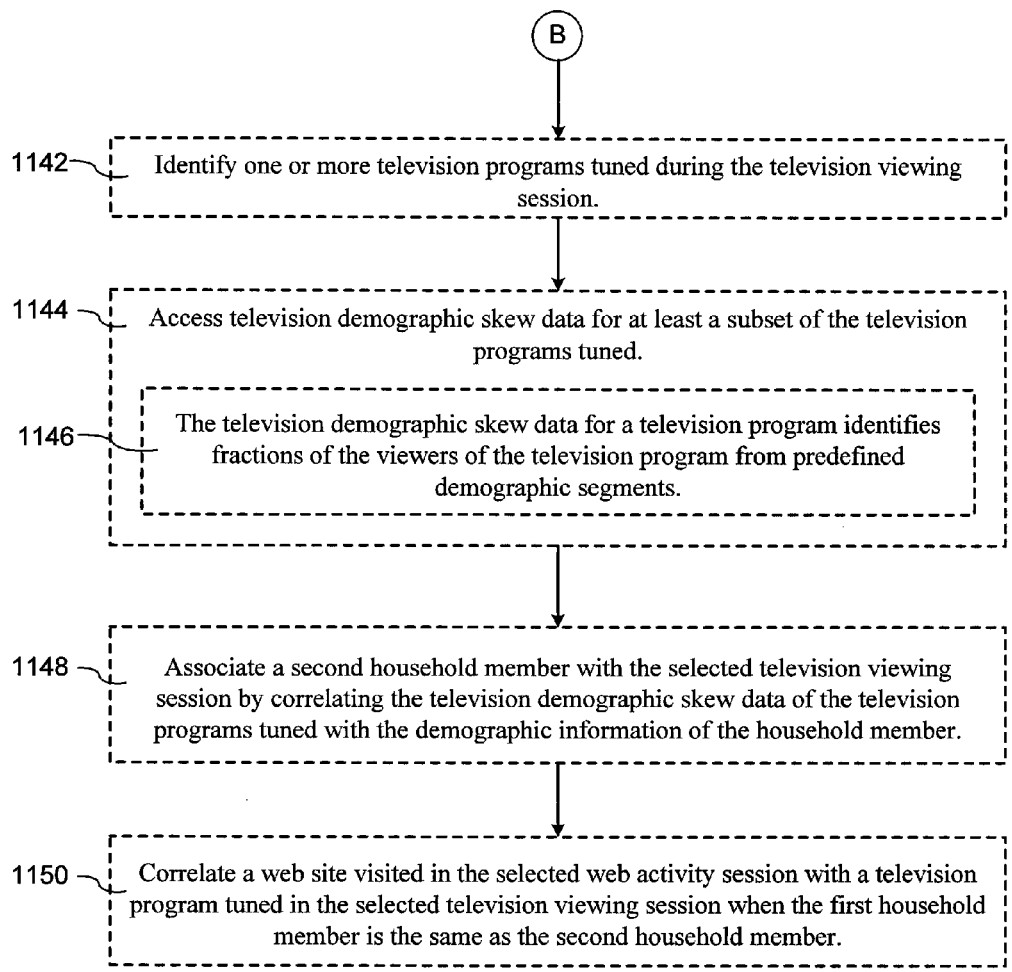

FIGS. 11A-C illustrate an exemplary process 1100 for associating web site visits with an individual household member. The process 1100 is performed (1102) at a server having one or more processors and memory. In process 1100, the server receives (1104) demographic information for a plurality of household members. This information is typically received as part of a registration process in which a household agrees to have its web activity monitored in exchange for some benefit (e.g., monetary compensation, special offers, reduced cost for access to the Internet, parental control tools, etc.). The demographic information includes (1104) at least the age and gender of each household member. In some implementations, the information includes the birth dates of the household members instead of ages. In some implementations, the demographic information for the household members includes (1106) specific individual interests 518 of the household members. In some implementations, the information includes favorite web sites 520 and favorite television programs 522 of the household members.

The server also receives (1108) web activity information for the household. The web activity information is usually received in a batch on a periodic basis, such as once a week, once per day, or once per hour. In some implementations, the web activity information is received on a continuous basis and stored for subsequent processing. The web activity information identifies all of the web activity for the household, including web site visits 144 and web searches 146. The server identifies (1110) within the web activity information one or more web activity sessions. In some instances a session is identified by a span of time. In other instances a session may be identified by web activity that is logically related. In some implementations, web activity sessions are identified both by time and the nature of the web sites visited. In some implementations, web activity sessions can have overlapping time spans. This can occur, for example, when a single household has more than one computer 200 and two or more household members 118 access the web simultaneously. In some implementations, each client computer 200 has a unique computer ID (e.g., the MAC Address), which is included in the web activity information. In some implementations, the unique computer ID is assigned by the server and stored in a browser cookie 224 on the client computer 200. The presence of a unique computer ID enables identification of web activity from different computers to be tracked as separate web activity sessions, even when there is web activity from multiple computers 200 at the same household 180 at the same time. In some implementations, each web activity session has (1112) a respective start time and a respective end time.

The server selects (1114) one of the web activity sessions. In some instances, a web activity session consists of (1116) a single web site visit. In some implementations, every web activity session consists of a single web site visit. The server identifies (1118) one or more web sites 144 visited during the selected web activity session.

The server also accesses (1120) web demographic skew data for at least a subset of the web sites visited. Web demographic skew data was explained above in FIGS. 9, 10A, and 10B. The web demographic skew data for a web site identifies (1122) fractions of the visitors to the web site from predefined demographic segments. In general, the demographic segments are non-overlapping, and every web site visitor is in one of the demographic segments, so the sum of the fractions for each web site is 1. The actual "skew" for a demographic segment for a particular web site is the difference between the fraction of visitors to the web site from the demographic segment and the fraction of the population from the demographic segment. I.e., the skew $s_{ij}$ is $p_{ij} - d_j$, as explained above in reference to FIG. 10B. In some implementations, the demographic skew data includes this number in addition to, or instead of the fractions. See, for example, FIG. 10B, data for web site 1030-3: some implementations store just the distribution data 0.04, 0.85, 0.03, and 0.08; other implementations also (or instead) store the skews −0.09, 0.50, −0.12, and −0.29. Whereas the distribution fractions sum to 1, the skew fractions sum to 0. Note that the skew values identify the fractions because the fractions equal the sum of the skew and the population distribution: $p_{ij} = s_{ij} + d_j$. In some implementations, the web demographic skew data is stored (1124) in a database accessible by the server.

The server associates (1126) a first household member with the selected web activity session at least in part by correlating the web demographic skew data of the web sites visited with the demographic information of the first household member. An exemplary process for performing this correlation was provided above with respect to FIGS. 10A and 10B. In some implementations, the association of the first household member with the web activity session has (1128) a calculated probability. That is, rather that making a yes/no decision about the association, there is an estimated likelihood of a correlation. This can be important because the various processes that later use the correlation have different confidence requirements. In some implementations, the association of the first household member with the selected web activity session occurs (1130) only when the calculated probability exceeds a predefined threshold. For example, the threshold may be 90%, 95%, or 99%. In some implementations, the associating further comprises correlating (1134) at least one individual interest 518 of the first household member with a topical keyword (546 or 548) assigned to at least one of the web sites visited in the selected web activity session.

In some instances, it may be appropriate to associate a specific household member with a web activity session even when the probability for that household member is not large. For example, consider a household 180 with members 180-1 to 180-6. Suppose there is a 50% probability that a certain web activity session is associated with member 180-1, and a 10% chance for each of the other household members. In this case, some implementations will associate the web activity session with household member 180-1 because the probability is so much higher than the probability for any of the other household members. In these implementations, the correlating includes (1132) computing a member probability for each household member, where each member probability indicates the likelihood that the respective household member corresponds to the selected web activity session. When the member probability for the first household member exceeds the member probability for each of the other household members by a predetermined margin, the web activity session is associated (1132) with the first household member.

In some implementations, web site visits for one household member are correlated with television programs viewed by the same household member. Essentially the same process for web activity is applied to television viewing activity, and then the web activity is linked to the television activity because they are associated with the same person. In these implementations, the process 1100 further includes receiving (1136) television viewing information for the household 180. The server identifies (1138) one or more television viewing sessions from the television viewing information, and selects (1140) one of the television viewing sessions. The server identifies (1142) one or more television programs tuned during the television viewing session. As used herein, "tuned" indicates that the set top box 400 (or receiver/converted 110) is tuned so that the particular television program is being transmitted to the television 116 or a recording device. In general, a household member is viewing the television program, but there is no requirement that a household member view the television program at all times. The term "tuned" here is used to indicate that the particular television program has been selected. The signal for the television program is being transmitted to a television 116 for display or transmitted to a recording device, such as a digital video recorder. Some implementations include in the television viewing information only television programs that are actually displayed on the television screen, whereas other implementations include television programs that are displayed or recorded. In some implementations, the television viewing information includes an indicator to specify whether a particular program was displayed or recorded (or both).

In some implementations, the server accesses (1144) television demographic skew data for at least a subset of the television programs tuned. The television demographic skew data for a television program identifies (1146) fractions of the viewers of the television program from predefined demographic segments. In these implementations, the server associates (1148) a second household member with the selected television viewing session by correlating the television demographic skew data of the television programs tuned with the demographic information of the household member. The server also correlates (1150) a web site visited in the selected web activity session with a television program tuned in the selected television viewing session when the first household member is the same as the second household member. In some of these implementations, the correlation occurs only when there is additional data to correlate the web site with the television program, such as the keywords 546 and/or categories 548 of the web site 540 corresponding to the keywords 558 and/or categories 560 of the television program 550.

Figure 12A:
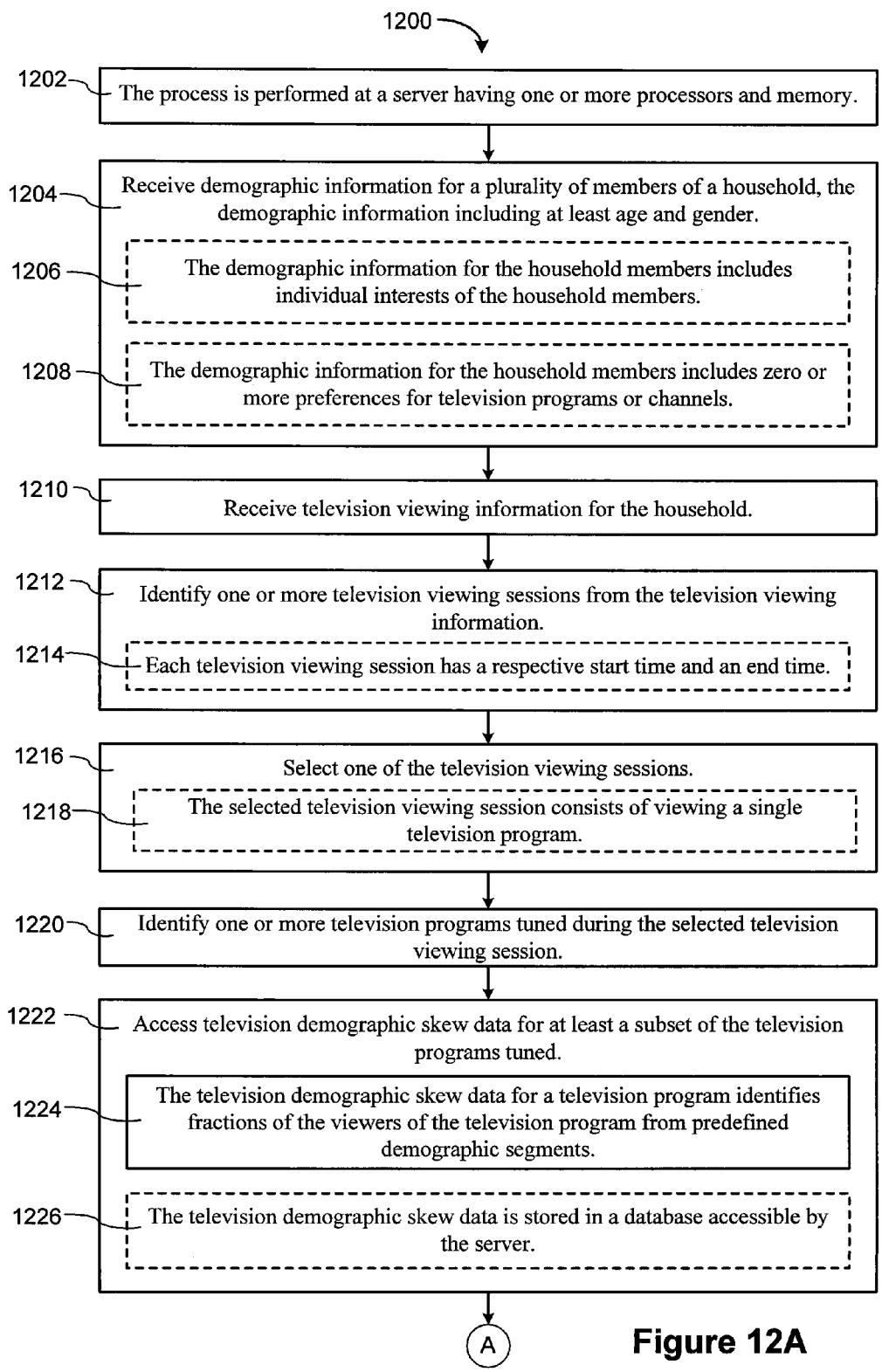
FIGS. 12A-B illustrate an exemplary process for correlating television viewing with an individual household member according to some implementations.
Figure 12B:
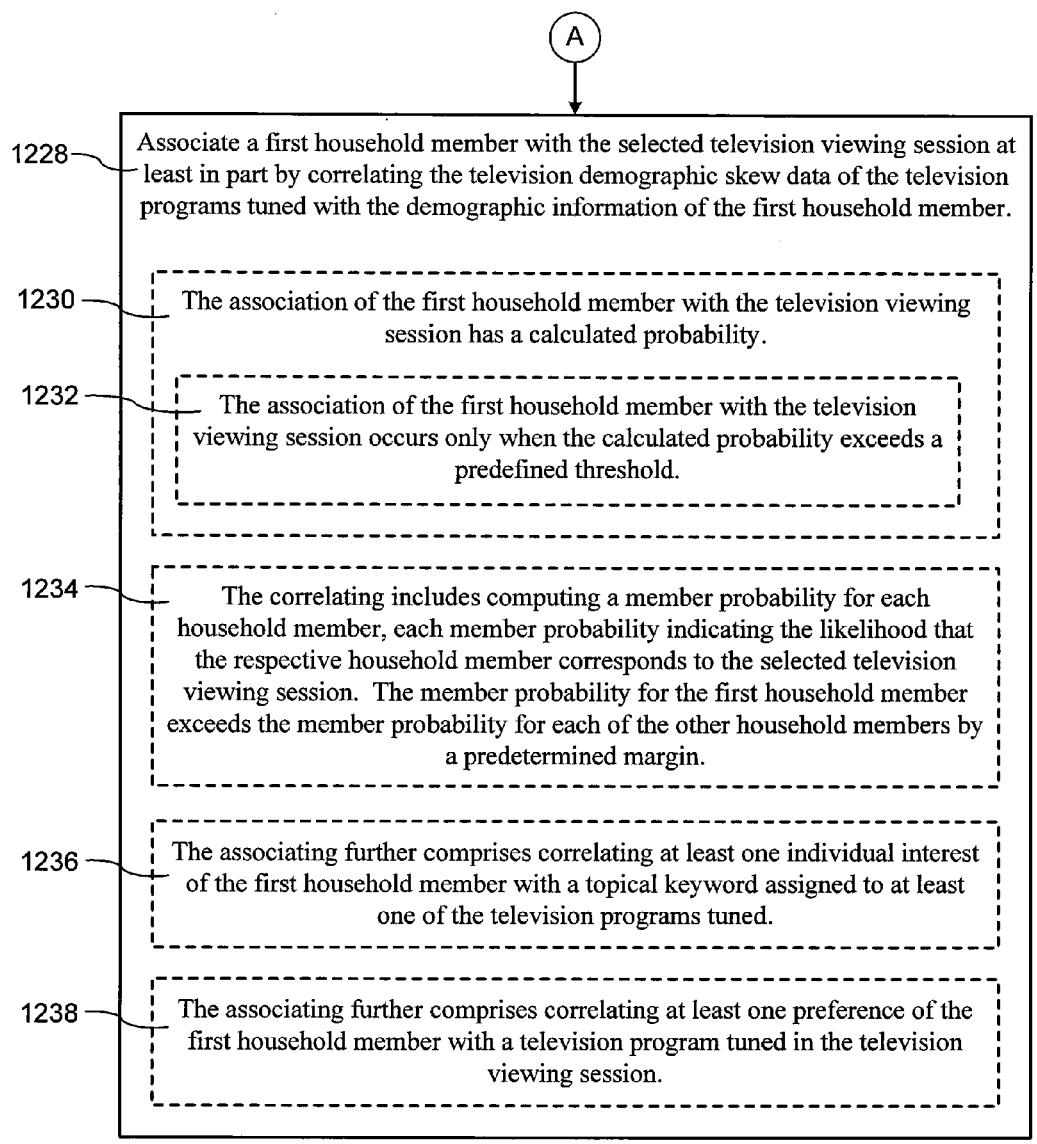

FIGS. 12A-B illustrate an exemplary process 1200 for associating television viewing with an individual household member. In large part the process 1200 is similar to the process 1100, but applied to television viewing information rather than web activity information. The process 1200 is performed (1202) at a server having one or more processors and memory. The server receives (1204) demographic information for a plurality of household members. This information is typically received as part of a registration process in which a household agrees to have its web activity monitored in exchange for some benefit (e.g., monetary compensation, special offers, reduced cost for access to the Internet, parental control tools, etc.). The demographic information includes (1204) at least the age and gender of each household member. In some implementations, the information includes the birth dates of the household members instead of ages. In some implementations, the birth dates include only month and year. In some implementations, the demographic information for the household members includes (1206) specific individual interests 518 of the household members. In some implementations, the information includes favorite web sites 520 and favorite television programs 522 of the household members. In some implementations, the demographic information for the household members includes (1208) zero or more preferences for television programs or channels (522 or 524).

The server also receives (1210) television viewing information for the household. The television viewing information is usually received in a batch on a periodic basis, such as once a week, once per day, or once per hour. In some implementations, the television viewing information is received on a continuous basis and stored for subsequent processing (e.g., in TV log 154). The television viewing information identifies all of the television viewing for the household. The server identifies (1212) one or more television viewing sessions from the television viewing information. In some instances a session is identified by a span of time. In other instances a session may be identified by television programs that are logically related. In some implementations, television viewing sessions are identified both by time and the nature of the television programs tuned. In some implementations, television viewing sessions can have overlapping time spans. This can occur, for example, when a single household has two or more televisions 116, with corresponding set top boxes 400 and/or receiver/converters 110, and two or more household members 118 have the televisions 116 turned on at the same time. In some implementations, each television 116 or set top box 400 has a unique ID 424, which is included in the television viewing information. In some implementations, the unique ID 424 is assigned by the server and stored at the set top box 400. The presence of a unique ID enables identification of television viewing from different television sets 116 to be tracked as separate television viewing sessions, even when there is television activity at multiple television sets 116 at the same household 180 at the same time. In some implementations, each television viewing session has (1214) a respective start time and a respective end time.

The server selects (1216) one of the television viewing sessions. In some instances, a television viewing session consists of (1218) viewing a single television program. In some implementations, every television viewing session consists of viewing a single television program. The server identifies (1220) one or more television programs tuned during the selected television viewing session. As noted above, "tuned" indicates that a particular program has been selected or accessed. In general, there are one or more household members who are viewing the television program, but the household members could step away from the television or there could be a recording device recording the television program.

The server also accesses (1222) television demographic skew data for at least a subset of the television programs tuned. Television demographic skew data is analogous to the web demographic skew data explained above in FIGS. 9, 10A, and 10B. The television demographic skew data for a television program identifies (1224) fractions of the viewers of the television program from predefined demographic segments. In general, the demographic segments are non-overlapping, and every viewer of a television program is in one of the demographic segments, so the sum of the fractions for each television program is 1. The actual "skew" for a demographic segment for a particular television program is the difference between the fraction of viewers of the television program from the demographic segment and the fraction of the population from the demographic segment. I.e., the skew $s_{ij}$ is $p_{ij}-d_j$, as explained above in reference to FIG. 10B for web demographic data. Note that the skew values identify the fractions because the fractions equal the sum of the skew and the population distribution: $p_{ij}=s_{ij}+d_j$. In some implementations, the television demographic skew data is stored (1226) in a database accessible by the server.

The server associates (1228) a first household member with the selected television viewing session at least in part by correlating the television demographic skew data of the television programs tuned with the demographic information of the first household member. An exemplary process for performing this correlation was provided above with respect to FIGS. 10A and 10B in the context of web site visits. In some implementations, the association of the first household member with the television viewing session has (1230) a calculated probability. This can be important because the various processes that later use the correlation have different confidence requirements. For example, one advertiser may only want its ad displayed to a television viewer when the confidence is 95% that the viewer is in a specific demographic group, whereas another advertiser may only require 60% certainty of the viewer demographic segment in order to display its advertisement. In some implementations, the association of the first household member with the selected television viewing session occurs (1232) only when the calculated probability exceeds a predefined threshold. For example, the threshold may be 70%, 80%, or 90%. In some implementations, the associating further comprises correlating (1236) at least one individual interest 518 of the first household member with a topical keyword (558 or 560) assigned to at least one of the TV shows tuned in the selected television viewing session.

In some implementations, the correlating includes (1234) computing a member probability for each household member, where each member probability indicates the likelihood that the respective household member corresponds to the selected television viewing session. When the member probability for the first household member exceeds the member probability for each of the other household members by a predetermined margin, the television viewing session is associated (1234) with the first household member. In some implementations, associating a television viewing session with a household member also includes (1238) correlating at least one preference (522 or 524) of the household member 118 with a television program tuned in the television viewing session.

Figure 13:
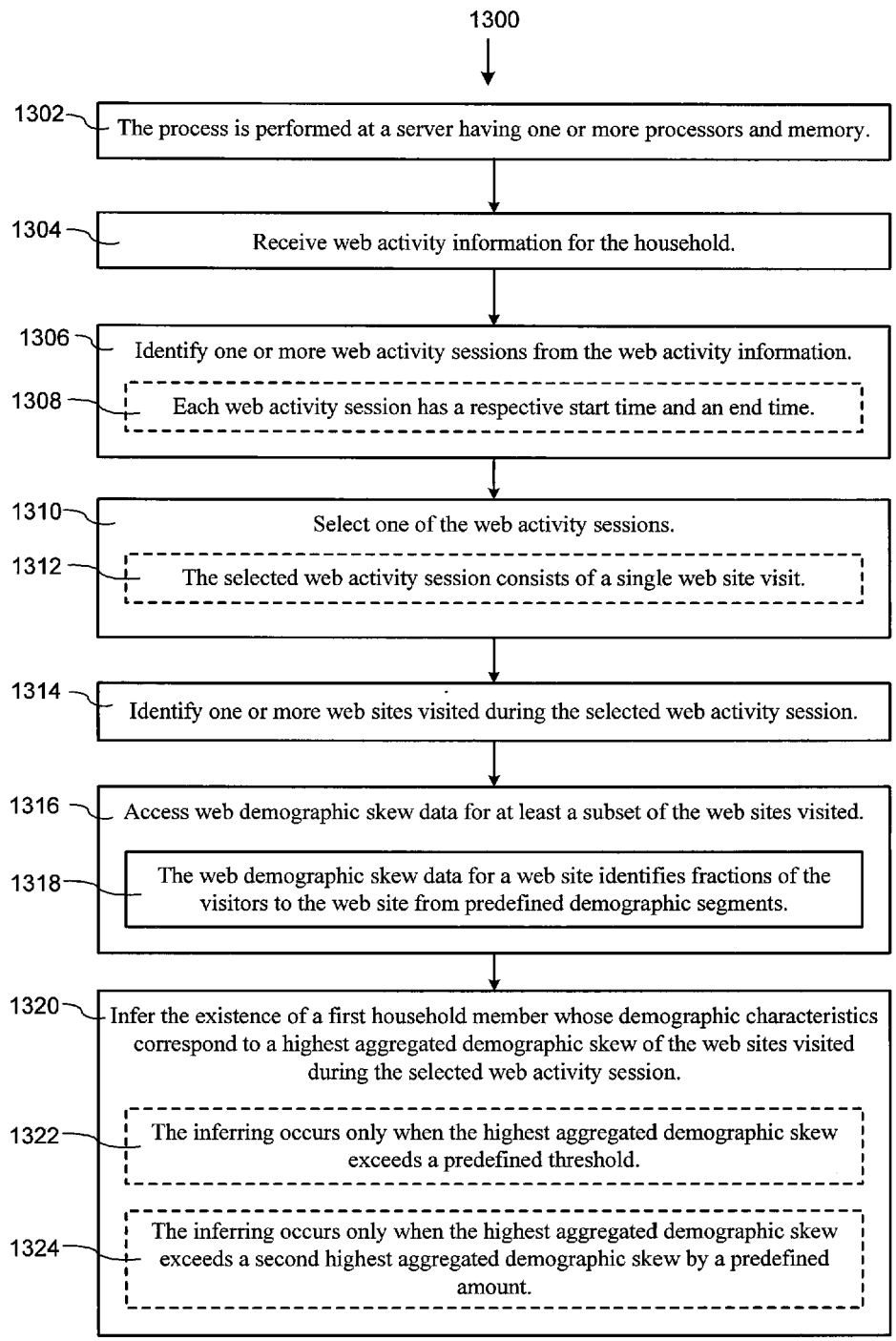
FIGS. 13 and 14 illustrate processes to infer the existence of a household member with certain demographic characteristics according to some implementations.

FIG. 13 illustrates an exemplary process 1300 for inferring the existence of a household member 118 with certain demographic characteristics based on web activity. The process 1300 is performed (1302) at a server having one or more processors and memory. In process 1300, the server receives (1304) web activity information for the household. The web activity information is usually received in a batch on a periodic basis, such as once a week, once per day, or once per hour. In some implementations, the web activity information is received on a continuous basis and stored for subsequent processing, such as in Internet logs 142. The web activity information identifies all of the web activity for the household, including web site visits 144 and web searches 146. The server identifies (1306) within the web activity information one or more web activity sessions. In some instances a session is identified by a span of time. In other instances a session may be identified by web activity that is logically related. In some implementations, web activity sessions are identified both by time and the nature of the web sites visited. In some implementations, each web activity session has (1308) a respective start time and a respective end time.

The server selects (1310) one of the web activity sessions. In some instances, a web activity session consists of (1312) a single web site visit. In some implementations, every web activity session consists of a single web site visit. The server identifies (1314) one or more web sites 144 visited during the selected web activity session.

The server also accesses (1316) web demographic skew data for at least a subset of the web sites visited. Web demographic skew data was explained above in FIGS. 9, 10A, and 10B. The web demographic skew data for a web site identifies (1318) fractions of the visitors to the web site from predefined demographic segments. In general, the demographic segments are non-overlapping, and every web site visitor is in one of the demographic segments, so the sum of the fractions for each web site is 1. The actual "skew" for a demographic segment for a particular web site is the difference between the fraction of visitors to the web site from the demographic segment and the fraction of the population from the demographic segment.

The server infers (1320) the existence of a first household member whose demographic characteristics correspond to a highest aggregated demographic skew of the web sites visited during the selected web activity session. As noted above with respect to FIG. 10B, the skews for each web site within a web activity session can be combined, such as by summing or taking the average. For example, if web sites 1, 2, . . . , n are visited in one web activity session, then demographic segment j has aggregated skew $$S_j = \sum_{i=1}^{n} (p_{ij} - d_j),$$

where $p_{ij}-d_j$ is the skew for web site i with respect to demographic segment j. The demographic segment with the highest (positive) aggregated skew is selected as the probable demographic segment of a household member. In some implementations, inferring the existence of a household member in the demographic segment occurs (1322) only when the highest aggregated demographic skew exceeds a predefined threshold. In some implementations, inferring the existence of a household member in the demographic segment occurs (1324) only when the highest aggregated demographic skew exceeds a second highest aggregated demographic skew by a predefined amount. As one of ordinary skill in the art will recognize, there are other ways for making the inference decision, such as computing the statistical probability that the aggregated skew would reach a certain level, and making the inference only when the probability is high enough.

Figure 14:
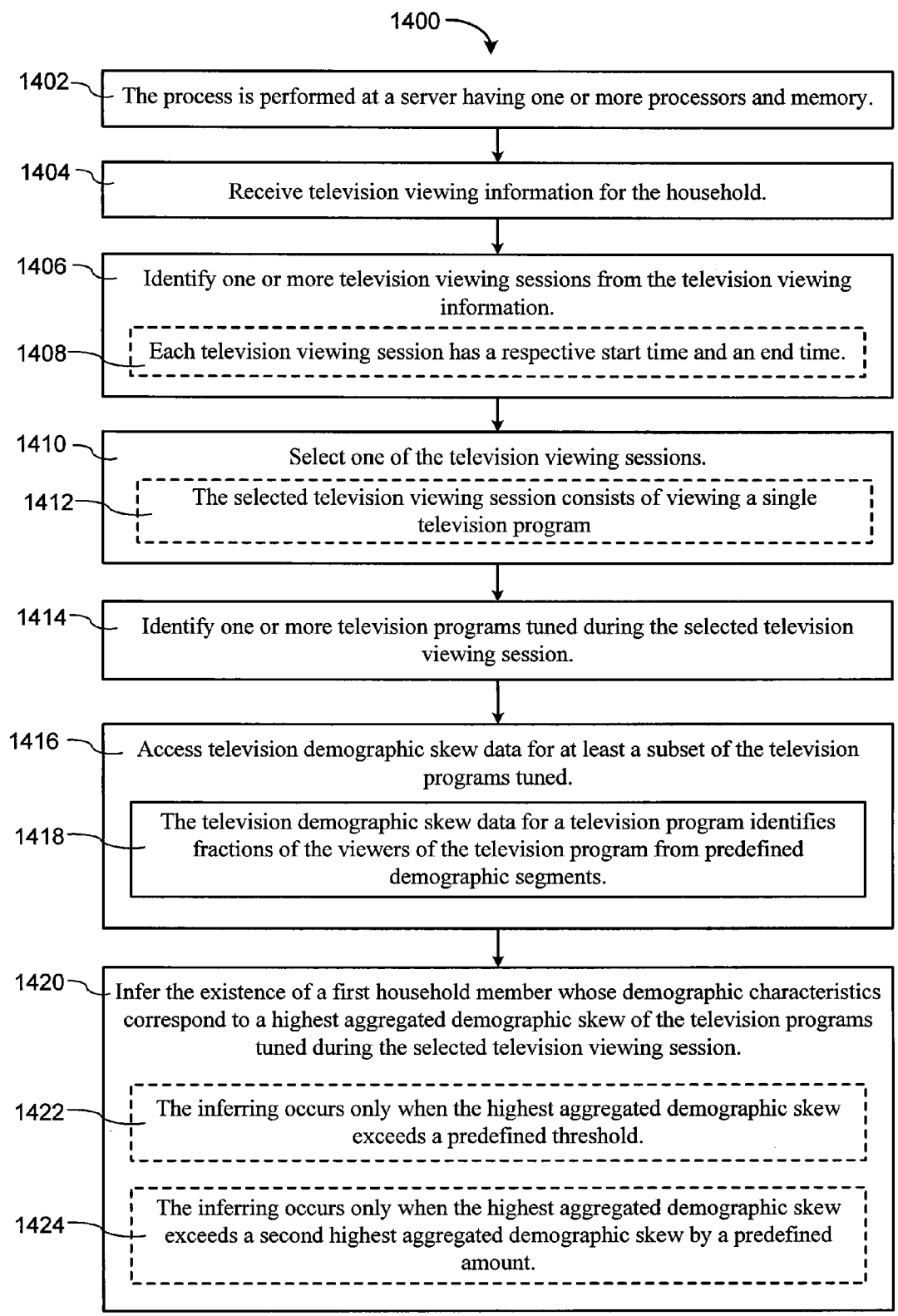

FIG. 14 illustrates an exemplary process 1400 for inferring the existence of a household member 118 with certain demographic characteristics based on television viewing activity. The process 1400 is performed (1402) at a server having one or more processors and memory. In process 1400, the server receives (1404) television viewing information for the household. The television viewing information is usually received in a batch on a periodic basis, such as once a week, once per day, or once per hour. In some implementations, the television viewing information is received on a continuous basis and stored for subsequent processing, such as in TV log 154. The server identifies (1406) within the television viewing information one or more television viewing sessions. In some instances a session is identified by a span of time. In other instances a session may be identified by television programs that are logically related. In some implementations, television viewing sessions are identified both by time and the nature of the television programs tuned. In some implementations, each television viewing session has (1408) a respective start time and a respective end time.

The server selects (1410) one of the television viewing sessions. In some instances, a television viewing session consists of (1412) viewing a single television program. In some implementations, every television viewing session consists of viewing a single television program. The server identifies (1414) one or more television programs tuned during the selected television viewing session.

The server also accesses (1416) television demographic skew data for at least a subset of the television programs tuned. Television demographic skew data is analogous to the web demographic skew data explained above in FIGS. 9, 10A, and 10B. The television demographic skew data for a television program identifies (1418) fractions of the viewers of the television program from predefined demographic segments. In general, the demographic segments are non-overlapping, and every television program viewer is in one of the demographic segments, so the sum of the fractions for each television program is 1. The actual "skew" for a demographic segment for a particular web site is the difference between the fraction of viewers of the television program from the demographic segment and the fraction of the population from the demographic segment.

The server infers (1420) the existence of a first household member whose demographic characteristics correspond to a highest aggregated demographic skew of the television programs tuned during the selected television viewing session. The skews for each television program within a television viewing session can be combined, such as by summing or taking the average. For example, if television programs 1, 2, . . . , n are tuned in one television viewing session, then demographic segment j has aggregated skew $$S_j = \sum_{i=1}^{n} (p_{ij} - d_j), \text{ where } p_{ij} - d_j$$

is the skew for television program i with respect to demographic segment j. The demographic segment with the highest (positive) aggregated skew is selected as the probable demographic segment of a household member. In some implementations, inferring the existence of a household member in the demographic segment occurs (1422) only when the highest aggregated demographic skew exceeds a predefined threshold. In some implementations, inferring the existence of a household member in the demographic segment occurs (1424) only when the highest aggregated demographic skew exceeds a second highest aggregated demographic skew by a predefined amount. As one of ordinary skill in the art will recognize, there are other ways for making the inference decision, such as computing the statistical probability that the aggregated skew would reach a certain level, and making the inference only when the probability is high enough.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of associating a household member with web activity, comprising:
   receiving, by a communications module of a log server, from a household database, demographic information for a plurality of members of a household;
   receiving, by the communications module of the log server, from an Internet log database populated by a household router, web activity information for the household;
   identifying, by a correlation module of the log server, from the Internet log database, a web activity session from the web activity information, wherein the web activity session is associated with a single member of the household;
   identifying, by the correlation module of the log server, from the Internet log database, a plurality of web sites visited during the web activity session;
   accessing, by the communications module of the log server, from a demographics database, web demographic distribution data for at least some of the plurality of the web sites visited, wherein the web demographic distribution data maintained in the demographics database for a web site identifies a respective percentage of total visits to the web site for each of a plurality of predefined demographic segments that partition the total visits based on the demographics information;
   computing, by the correlation module of the log server, a member probability for each respective household member that specifies the likelihood that the respective household member conducted the web activity session, wherein the computation for each respective household member correlates the web demographic distribution data of the web sites visited with the respective demographic information of the respective household member;
   determining, by the correlation module of the log server, that a first household member of the plurality of members of the household is the member of the household who conducted the web activity session when the member probability for the first household member exceeds the member probability for each of the other household members by a predetermined margin;
   receiving, by the communications module the log server from a set top box connected to a television device distinct from a computing device that performed the web activity, television viewing information for the household, wherein the television viewing is performed at a television device distinct from a computing device that performed the web activity;
   identifying, by the correlation module of the log server, a television viewing session from the television viewing information;
   identifying, by the correlation module of the log server, one or more television programs tuned during the television viewing session;
   accessing, by the communications module of the log server, from the demographics database, television demographic distribution data for at least a subset of the television programs tuned, wherein the television demographic distribution data maintained in the demographics database for a television program identifies a respective percentage of total viewership of the television program for each of the plurality of predefined demographic segments that partition the total viewership;
   identifying, by the correlation module of the log server, a second household member of the plurality of members of the household as a member of the household who conducted the selected television viewing session by correlating the television demographic distribution data of the television programs tuned with the demographic information of the second household member; and
   correlating, by the correlation module of the log server, a web site visited in the selected web activity session with a television program tuned in the selected television viewing session when the first household member is the same as the second household member.

2. The method of claim 1, wherein the web demographic distribution data is stored in a database accessible by the server.

3. The method of claim 1, wherein the web activity session has a start time and an end time.

4. The method of claim 1, wherein the demographic information for the first household member includes individual interests of the first household member.

5. The method of claim 4, wherein the determining further comprises correlating at least one individual interest of the first household member with a topical keyword assigned to at least one of the web sites visited.

6. A method of associating a household member with web activity, comprising:
   receiving, by a communications module of a log server, from a household database, demographic information for a plurality of members of a household;
   receiving, by the communications module of the log server, from an Internet log database populated by a household router, web activity information for the household;
   identifying, by a correlation module of the log server, from the Internet log database, a plurality of web sites visited from the web activity information, wherein the web site visits are associated with a single member of the household;

accessing, by the communications module of the log server, from a demographics database, web demographic distribution data for the web sites visited, wherein the web demographic distribution data maintained in the demographics database for each respective web site specifies a respective percentage of total visits to the web site for each of a plurality of predefined demographic segments that partition the total visits based on the demographics information;

computing, by the correlation module of the log server, a member probability for each respective household member that specifies the likelihood that the respective household member conducted the web activity session, wherein the computation for each respective household member correlates the web demographic distribution data of the web sites visited with the respective demographic information of the respective household member;

determining, by the correlation module of the log server, that a first household member of the plurality of members of the household is the member of the household who visited the web sites when the member probability for the first household member exceeds the member probability for each of the other household members by a predetermined margin;

receiving, by the communications module the log server from a set top box connected to a television device distinct from a computing device that performed the web activity, television viewing information for the household, wherein the television viewing is performed at a television device distinct from a computing device that performed the web activity;

identifying, by the correlation module of the log server, a television viewing session from the television viewing information;

identifying, by the correlation module of the log server, one or more television programs tuned during the television viewing session;

accessing, by the communications module of the log server, from the demographics database, television demographic distribution data for at least a subset of the television programs tuned, wherein the television demographic distribution data maintained in the demographics database for a television program identifies a respective percentage of total viewership of the television program for each of the plurality of predefined demographic segments that partition the total viewership;

identifying, by the correlation module of the log server, a second household member of the plurality of members of the household as a member of the household who conducted the selected television viewing session by correlating the television demographic distribution data of the television programs tuned with the demographic information of the second household member; and correlating, by the correlation module of the log server, a web site visited in the selected web activity session with a television program tuned in the selected television viewing session when the first household member is the same as the second household member.

7. A computer system for associating a household member with web activity, comprising:
   memory;
   one or more processors; and
   one or more programs stored in the memory and configured for execution by the one or more processors of a log server, the one or more programs including:

instructions for receiving, by a communications module of a log server, from a household database, demographic information for a plurality of members of a household;

instructions for receiving, by the communications module of the log server, from an Internet log database populated by a household router, web activity information for the household;

instructions for identifying, by a correlation module of the log server, from the Internet log database, a web activity session from the web activity information, wherein the web activity session is associated with a single member of the household;

instructions for identifying, by the correlation module of the log server, from the Internet log database, a plurality of web sites visited during the web activity session;

instructions for accessing, by the communications module of the log server, from a demographics database, web demographic distribution data for at least some of the plurality of the web sites visited, wherein the web demographic distribution data maintained in the demographics database for a web site specifies a respective percentage of total visits to the web site for each of a plurality of predefined demographic segments that partition the total visits based on the demographics information;

instructions for computing, by the correlation module of the log server, a member probability for each respective household member that specifies the likelihood that the respective household member conducted the web activity session, wherein the computation for each respective household member correlates the web demographic distribution data of the web sites visited with the respective demographic information of the respective household member;

instructions for determining, by the correlation module of the log server, that a first household member of the plurality of members of the household is the member of the household who conducted the web activity session when the member probability for the first household member exceeds the member probability for each of the other household members by a predetermined margin;

instructions for receiving, by the communications module the log server from a set top box connected to a television device distinct from a computing device that performed the web activity, television viewing information for the household, wherein the television viewing is performed at a television device distinct from a computing device that performed the web activity;

instructions for identifying, by the correlation module of the log server, a television viewing session from the television viewing information;

instructions for identifying, by the correlation module of the log server, one or more television programs tuned during the television viewing session;

instructions for accessing, by the communications module of the log server, from the demographics database, television demographic distribution data for at least a subset of the television programs tuned, wherein the television demographic distribution data maintained in the demographics database for a television program specifies a respective percentage of total viewership of the television program for each of the plurality of predefined demographic segments that partition the total viewership;

instructions for identifying, by the correlation module of the log server, a second household member of the plurality of members of the household as a member of the household who conducted the selected television viewing session by correlating the television demographic distribution data of the television programs tuned with the demographic information of the second household member; and instructions for correlating, by the correlation module of the log server, a web site visited in the selected web activity session with a television program tuned in the selected television viewing session when the first household member is the same as the second household member.

8. A non-transitory computer readable storage medium storing one or more programs to be executed by a log server computer system, the one or more programs comprising:

instructions for receiving, by a communications module of the log server, from a household database, demographic information for a plurality of members of a household;

instructions for receiving, by the communications module of the log server, from an Internet log database populated by a household router, web activity information for the household;

instructions for identifying, by a correlation module of the log server, from the Internet log database, a web activity session from the web activity information, wherein the web activity session is associated with a single member of the household;

instructions for identifying, by the correlation module of the log server, from the Internet log database, a plurality of web sites visited during the web activity session;

instructions for accessing, by the communications module of the log server, from a demographics database, web demographic distribution data for at least some of the plurality of the web sites visited, wherein the web demographic distribution data maintained in the demographics database for a web site specifies a respective percentage of total visits to the web site for each of a plurality of predefined demographic segments that partition the total visits based on the demographics information;

instructions for computing, by the correlation module of the log server, a member probability for each respective household member that specifies the likelihood that the respective household member conducted the web activity session, wherein the computation for each respective household member correlates the web demographic distribution data of the web sites visited with the respective demographic information of the respective household member;

instructions for determining, by the correlation module of the log server, that a first household member of the plurality of members of the household is the member of the household who conducted the web activity session when the member probability for the first household member exceeds the member probability for each of the other household members by a predetermined margin;

instructions for receiving, by the communications module the log server from a set top box connected to a television device distinct from a computing device that performed the web activity, television viewing information for the household, wherein the television viewing is performed at a television device distinct from a computing device that performed the web activity;

instructions for identifying, by the correlation module of the log server, a television viewing session from the television viewing information;

instructions for identifying, by the correlation module of the log server, one or more television programs tuned during the television viewing session;

instructions for accessing, by the communications module of the log server, from the demographics database, television demographic distribution data for at least a subset of the television programs tuned, wherein the television demographic distribution data maintained in the demographics database for a television program specifies a respective percentage of total viewership of the television program for each of the plurality of predefined demographic segments that partition the total viewership;

instructions for identifying, by the correlation module of the log server, a second household member of the plurality of members of the household as conducting the selected television viewing session by correlating the television demographic distribution data of the television programs tuned with the demographic information of the second household member; and instructions for correlating, by the correlation module of the log server, a web site visited in the selected web activity session with a television program tuned in the selected television viewing session when the first household member is the same as the second household member.

9. A method of associating a household member with web activity, performed at a server, having one or more processors and memory, comprising:

receiving, by a communications module the log server from a set top box connected to a television device, television viewing information for the household, wherein the television device is distinct from a computing device that performed the web activity;

identifying, by a correlation module of the log server, from an Internet log database, a television viewing session from the television viewing information;

identifying, by the correlation module of the log server, from the Internet log database, one or more television programs tuned during the television viewing session;

accessing, by the communications module of the log server, from a demographics database, television demographic distribution data for at least a subset of the television programs tuned, wherein the television demographic distribution data maintained in the demographics database for a television program identifies a respective percentage of total viewership of the television program for each of a plurality of predefined demographic segments that partition the total viewership;

identifying, by the correlation module of the log server, a second household member of a plurality of members of the household as a member of the household who conducted the selected television viewing session by correlating the television demographic distribution data of the television programs tuned with the demographic information of the second household member; and correlating, by the correlation module of the log server, a web site visited in the selected web activity session with a television program tuned in the selected television viewing session when a first household member is the same as the second household member, the first household member a member of the household who conducted the web activity session when a member probability for the household member exceeds the member probability for each of the other household members by a predetermined margin, the member probability for each respective household member specifying the likelihood that the respective household member conducted the web activity session.

10. The method of claim 9, wherein the computation for each respective household member correlates demographic distribution data of web sites visited with a respective demographic information of the respective household member.

11. The method of claim 9, wherein the demographic information for the first household member includes individual interests of the first household member.

12. The method of claim 9, further comprising inferring, by the log server, the existence of a third household member of the household whose demographic characteristics correspond to a highest aggregated demographic skew of the web sites visited during the selected web activity session.

* * * * *